US011069032B2

(12) United States Patent
Pan et al.

(10) Patent No.: US 11,069,032 B2
(45) Date of Patent: Jul. 20, 2021

(54) SYSTEM AND METHOD OF REDUCING EFFECTS OF TURBULENCE IN AN IMAGE

(71) Applicant: CANON KABUSHIKI KAISHA, Tokyo (JP)

(72) Inventors: Ruimin Pan, Macquarie Park (AU); Philip John Cox, West Pennant Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 16/551,422

(22) Filed: Aug. 26, 2019

(65) Prior Publication Data

US 2020/0286209 A1 Sep. 10, 2020

(30) Foreign Application Priority Data

Mar. 4, 2019 (AU) ................................ 2019201467

(51) Int. Cl.
*G06T 5/00* (2006.01)
*G06T 5/50* (2006.01)
*G06T 5/10* (2006.01)

(52) U.S. Cl.
CPC ................ *G06T 5/002* (2013.01); *G06T 5/10* (2013.01); *G06T 5/50* (2013.01);
(Continued)

(58) Field of Classification Search
CPC .. G06T 5/002; G06T 5/50; G06T 5/10; G06T 2207/30181; G06T 2207/10032;
(Continued)

(56) References Cited

U.S. PATENT DOCUMENTS 8,315,426 B2    11/2012  Yea et al.
9,569,825 B2 *   2/2017  Yamada ................... H04N 5/21

OTHER PUBLICATIONS

Xie et al., Removing Turbulence Effect via Hybrid Total Variation and Deformation-Guided Kernel Regression, IEEE Transactions On Image Processing, vol. 25, No. 10, Oct. 2016 (Year: 2016).*

(Continued)

*Primary Examiner* — Chan S Park
*Assistant Examiner* — Daniel C Chang
(74) *Attorney, Agent, or Firm* — Canon U.S.A., Inc. IP Division

(57) ABSTRACT

A system and method of removing turbulence from an image of a time ordered sequence of image frames. The method comprises removing effects of turbulence from a first image of the sequence to create an initial corrected image frame; determining a number of iterations required to achieve a desired turbulence removal for a subsequent image in the sequence and satisfy a latency constraint and an available memory capacity; and determining, based on the number of required iterations, a minimum set of image frames required to remove turbulence from the subsequent image. The minimum set of image frames comprises: a number of image frames of the sequence, a number of image frames generated in an intermediate iteration of turbulence removal and the initial corrected image frame. The method further comprises using the minimum set of image frames to remove turbulence from the subsequent image of the sequence.

18 Claims, 18 Drawing Sheets

(52) U.S. Cl.
CPC ............... *G06T 2207/10032* (2013.01); *G06T 2207/20182* (2013.01); *G06T 2207/30181* (2013.01)

(58) Field of Classification Search
CPC . G06T 2207/20182; G06T 2207/10016; G06T 2207/20221; G06T 5/003; G06T 1/60; G06T 5/006; G06T 2207/30232; G06T 2200/16; G06T 2200/28
See application file for complete search history.

(56) References Cited

OTHER PUBLICATIONS

Yifei Lou et al, Video Stabilization of Atmospheric Turbulence Distortion, AIMS' Journals, Manuscript, Mar. 2013, 23 pages.
C. J. Carrano, et al., Adapting high-resolution speckle imaging to moving targets and platforms, SPIE Defense and Security Symposium, 12 pages, Orlando, Apr. 2004.

* cited by examiner

SYSTEM AND METHOD OF REDUCING EFFECTS OF TURBULENCE IN AN IMAGE

REFERENCE TO RELATED APPLICATION(S)

This application claims the benefit under 35 U.S.C. § 119 of the filing date of Australian Patent Application No. 2019201467, filed 4 Mar. 2019, hereby incorporated by reference in its entirety as if fully set forth herein.

TECHNICAL FIELD

The present invention relates to methods of video stabilization and artefacts removal for turbulence effect compensation in long distance imaging.

BACKGROUND

In long distance imaging applications such as long distance surveillance, due to camera movement, atmospheric turbulence or other disturbance, the captured video can appear blurry, geometrically distorted and unstable.

Often, the resolution bottle neck of long distance image capture is not the lens quality or the sensor size. Instead, atmospheric turbulence is typically the main reason why geometric distortion and blur exist in the captured videos. Long distance surveillance over water or a hot surface is particularly challenging as the refractive index along the imaging path varies strongly and randomly.

Atmospheric turbulence is mainly due to fluctuation in the refractive index of atmosphere. The refractive index variation of the atmosphere involves many factors including wind velocity, temperature gradients, and elevation.

Light in a narrow spectral band approaching the atmosphere from a distant light source, such as a star, is well modelled by a plane wave. The planar nature of this wave remains unchanged as long as the wave propagates through free space, which has a uniform index of refraction. The atmosphere, however, contains a multitude of randomly distributed regions of uniform index of refraction, referred to as turbulent eddies. The index of refraction varies from eddy to eddy. As a result, the light wave that travels in the atmosphere from a faraway scene is no longer planar by the time the light reaches a camera.

FIG. 1 illustrates the effect of Earth's atmosphere on the wavefront of a distance point source. In FIG. 1, after the plane wave passes through a turbulent layer in the atmosphere, the wavefront becomes perturbed. Excursions of the wave from a plane wave are manifested as random aberrations in image capture systems. The general effects of optical aberrations include broadening of the point spread function and lower resolution. Although some blurring effects can be corrected by fixed optics in the design of the lens, the spatially random and temporally varying nature of atmospheric turbulence makes it difficult to correct.

Traditionally in long distance image capture, multiple frames are needed to remove the turbulence effect. One known example uses a spatial and temporal diffusion method to reduce geometric distortion in each captured frame and stabilize the video across frames at the same time. Other known methods, such as a bispectrum method, try to extract the long exposure point spread function (PSF) of the atmospheric turbulence from a large number of frames and apply the PSF to deblur each frame.

With the advancement of surveillance equipment in recent years, the frame resolution of long distance surveillance video is growing rapidly. Processing turbulence affected videos with high frame resolution often requires expensive equipment with relatively large storage capacity and latest technology to improve computing power. Furthermore, because multiple frames including some future frames are needed to correct for the turbulence effect in the current frame, a certain amount of delay is introduced in the processed video. The more frames are needed, the longer the delay (latency) is.

An efficient real-time multi-frame video stabilization method is needed to handle the special case of long distance surveillance with severe turbulence effect in order to compensate for the geometric distortion and blur with reduced latency.

SUMMARY

It is an object of the present invention to substantially overcome, or at least ameliorate, one or more disadvantages of existing arrangements.

One aspect of the present disclosure provides a method of removing turbulence from an image of a time ordered sequence of image frames, the method comprising: removing effects of turbulence from a first image of the time ordered sequence of frames to create an initial corrected image frame; determining a number of iterations required to achieve a desired amount of turbulence removal for a subsequent image in the sequence and satisfy a latency constraint and an available memory capacity, the latency and the available memory capacity relating to a computing system implementing the turbulence removal; determining, based on the number of required iterations, a minimum set of image frames required to remove turbulence from the subsequent image, wherein said minimum set of image frames is stored in the available memory and comprises: a number of image frames of time ordered sequence of image frames, a number of image frames generated in an intermediate iteration of turbulence removal and the initial corrected image frame; and using said minimum set of image frames to remove turbulence from the subsequent image of time ordered sequence of image frames of the video to output a subsequent corrected image.

According to another aspect, the method further comprises determining, using the subsequent corrected image, that an additional iteration of turbulence removal is required.

According to another aspect, the method further comprises determining, using the subsequent corrected image, that an additional iteration of turbulence removal is required and that the additional iteration of turbulence removal satisfies the latency constraint and the available memory capacity.

According to another aspect, the method further comprises determining, using the subsequent corrected image, that an additional iteration of turbulence removal is required, wherein the minimum number of frames is updated to add a corrected version of a previous frame from the previous iteration.

According to another aspect, determining the number of iterations comprises determining a maximum number of iterations to satisfy the latency constraint and the available memory capacity.

According to another aspect, determining the number of iterations comprises determining a minimum number of iterations to provide the desired amount of turbulence removal.

According to another aspect, the minimum number of iterations is determined based on a geometric similarity of a number of the frames of the time ordered sequence.

According to another aspect, the method further comprises determining, using the subsequent corrected image, that additional turbulence removal is required, wherein the number of iterations is increased by a maximum of one iteration.

According to another aspect, determining the number of iterations comprises: determining a maximum number of iterations to satisfy the latency constraint and the available memory capacity; determining a minimum number of iterations to provide the desired amount of turbulence removal; and determining an average of the maximum and minimum number of iterations.

According to another aspect, the determined average number of iterations is used for every image frame of the time ordered sequence.

According to another aspect, the number of iterations required is determined separately for each image frame of the time ordered sequence.

According to another aspect, the turbulence removal comprises removing spatial blur followed by geometric distortion removal using the minimum set of frames stored in the memory.

According to another aspect, the method is implemented in real-time as the time ordered sequence of image frames is captured.

According to another aspect, the desired level of turbulence removal is determined using a gradient-based structural similarity index (G-SSIM) method and a number of the image frames of the time ordered sequence.

According to another aspect, removing turbulence from the subsequent image comprises combining (i) the initial corrected image, (ii) a corrected image of the subsequent frame from an intermediate iteration immediately preceding the current iteration and (ii) and an image frame for a next subsequent image in the sequence as corrected in the previous iteration.

Another aspect of the present disclosure provides a non-transitory computer readable medium having a computer program stored thereon to implement a method of removing turbulence from an image of a time ordered sequence of image frames, the program comprising: code for removing effects of turbulence from a first image of the time ordered sequence of frames to create an initial corrected image frame; code for determining a number of iterations required to achieve a desired amount of turbulence removal for a subsequent image in the sequence and satisfy a latency constraint and an available memory capacity, the latency and the available memory capacity relating to a computing system implementing the turbulence removal; code for determining, based on the number of required iterations, a minimum set of image frames required to remove turbulence from the subsequent image, wherein said minimum set of image frames is stored in the available memory and comprises: a number of image frames of time ordered sequence of image frames, a number of image frames generated in an intermediate iteration of turbulence removal and the initial corrected image frame; and code for using said minimum set of image frames to remove turbulence from the subsequent image of time ordered sequence of image frames of the video to output a subsequent corrected image.

Another aspect of the present disclosure provides an image capture device, comprising: a memory; and a processor configured to execute code stored on the memory implement a method of removing turbulence from an image of a time ordered sequence of image frames captured by the image capture device, the method comprising: removing effects of turbulence from a first image of the time ordered sequence of frames to create an initial corrected image frame; determining a number of iterations required to achieve a desired amount of turbulence removal for a subsequent image in the sequence and satisfy a latency constraint and an available capacity of the memory, the latency constraint relating to the image capture device and; determining, based on the number of required iterations, a minimum set of image frames required to remove turbulence from the subsequent image, wherein said minimum set of image frames is stored in the available memory and comprises: a number of image frames of time ordered sequence of image frames, a number of image frames generated in an intermediate iteration of turbulence removal and the initial corrected image frame; and using said minimum set of image frames to remove turbulence from the subsequent image of time ordered sequence of image frames of the video to output a subsequent corrected image.

Another aspect of the present disclosure provides a system, comprising: a memory; and a processor, wherein the processor is configured to execute code stored on the memory for implementing a method of removing turbulence from an image of a time ordered sequence of image frames, the method comprising: removing effects of turbulence from a first image of the time ordered sequence of frames to create an initial corrected image frame; determining a number of iterations required to achieve a desired amount of turbulence removal for a subsequent image in the sequence and satisfy a latency constraint and an available memory capacity of the memory, the latency relating to a computing system implementing the turbulence removal; determining, based on the number of required iterations, a minimum set of image frames required to remove turbulence from the subsequent image, wherein said minimum set of image frames is stored in the available memory and comprises: a number of image frames of time ordered sequence of image frames, a number of image frames generated in an intermediate iteration of turbulence removal and the initial corrected image frame; and using said minimum set of image frames to remove turbulence from the subsequent image of time ordered sequence of image frames of the video to output a subsequent corrected image.

Other aspects of the invention are also disclosed.

BRIEF DESCRIPTION OF THE DRAWINGS

One or more example embodiments of the invention will now be described with reference to the following drawings, in which.

DETAILED DESCRIPTION INCLUDING BEST MODE

Figure 1:
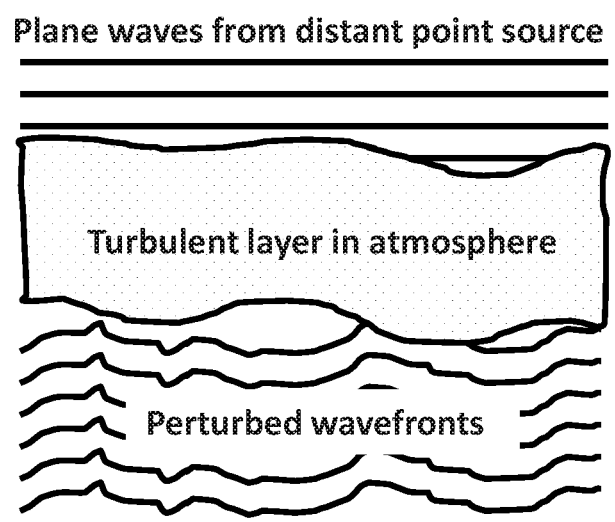
FIG. 1 illustrates the effect of atmospheric turbulence on the wavefront of a plane wave.

Where reference is made in any one or more of the accompanying drawings to steps and/or features, which have the same reference numerals, those steps and/or features have for the purposes of this description the same function(s) or operation(s), unless the contrary intention appears.

The arrangements described relate to a method of correcting turbulence images that can be implemented in real-time. A multi-frame video stabilization method is used to handle the special case of long distance surveillance with severe turbulence effects.

In the context of the present disclosure "removing turbulence" from an image (also referred to a correcting an image) relates to applying image processing in order to compensate for geometric distortion and blur caused by turbulence. In the example arrangements described, images or video are captured by one or more image capture devices. A processor or GPU of the image capture device executes the methods described to remove effects of turbulence. In other arrangements, the captured images can be transmitted to a remote computing device on which the methods described can be implemented.

As described above, more frames are needed to reduce the effects of turbulence in an image, the higher the latency in generating a corrected image frame. Therefore, a turbulence correction technique that can be implemented in real-time is required. The arrangements described relate to a method that allows loading as few frames as possible in the memory to reduce latency and computation, thus reduce hardware cost and enhance speed. On the other hand, in the multiple-frame turbulence removal scheme, a particular number of frames are needed to ensure the quality of the turbulence correction. Even through more frames does not necessarily guarantee good output quality, too few frames will typically lead to insufficient turbulence correction or unstable foreground moving object extraction.

Figure 17A:
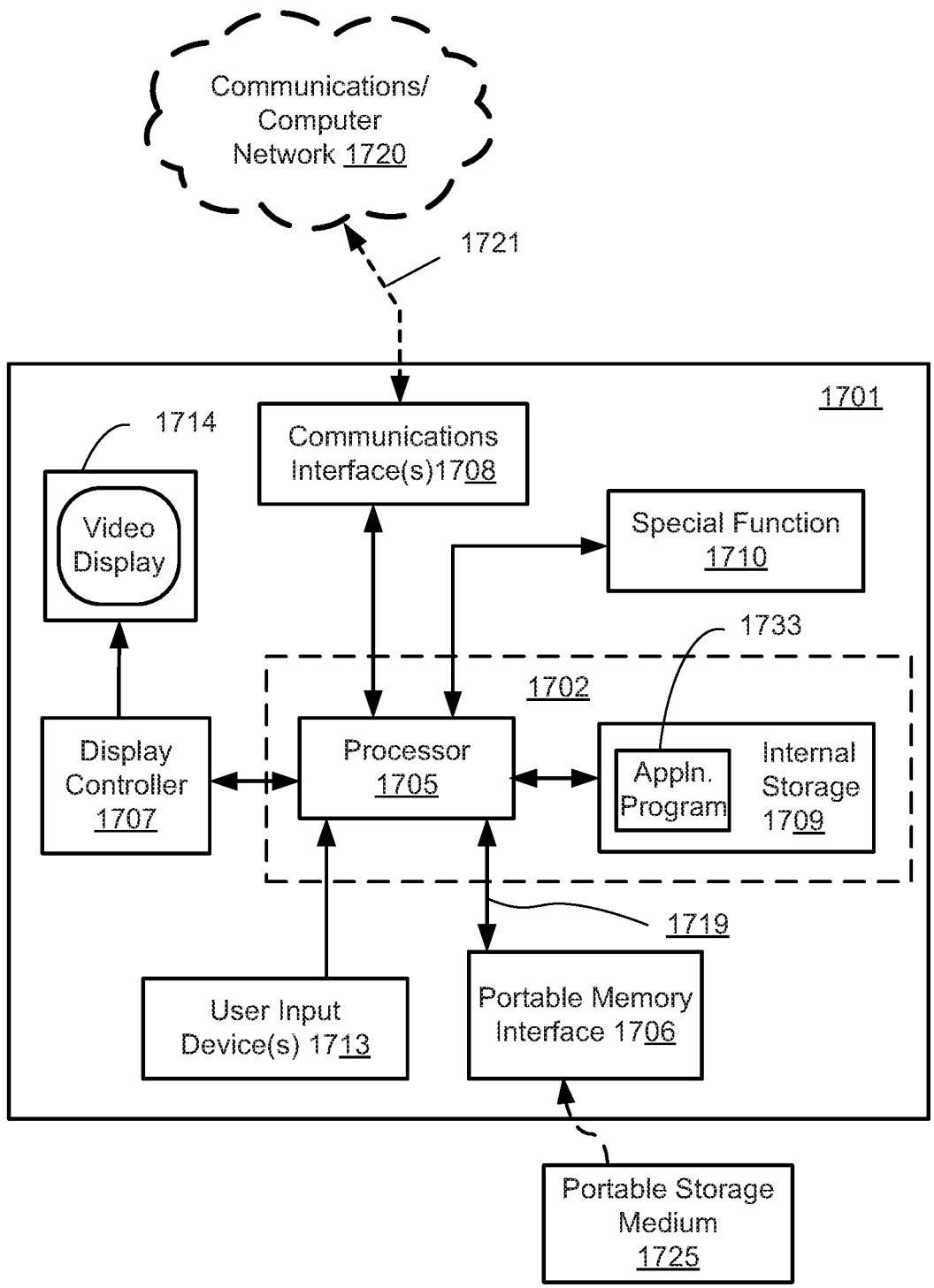
FIGS. 17A and 17B collectively form a schematic block diagram representation of an electronic device upon which described arrangements can be practised.
Figure 17B:
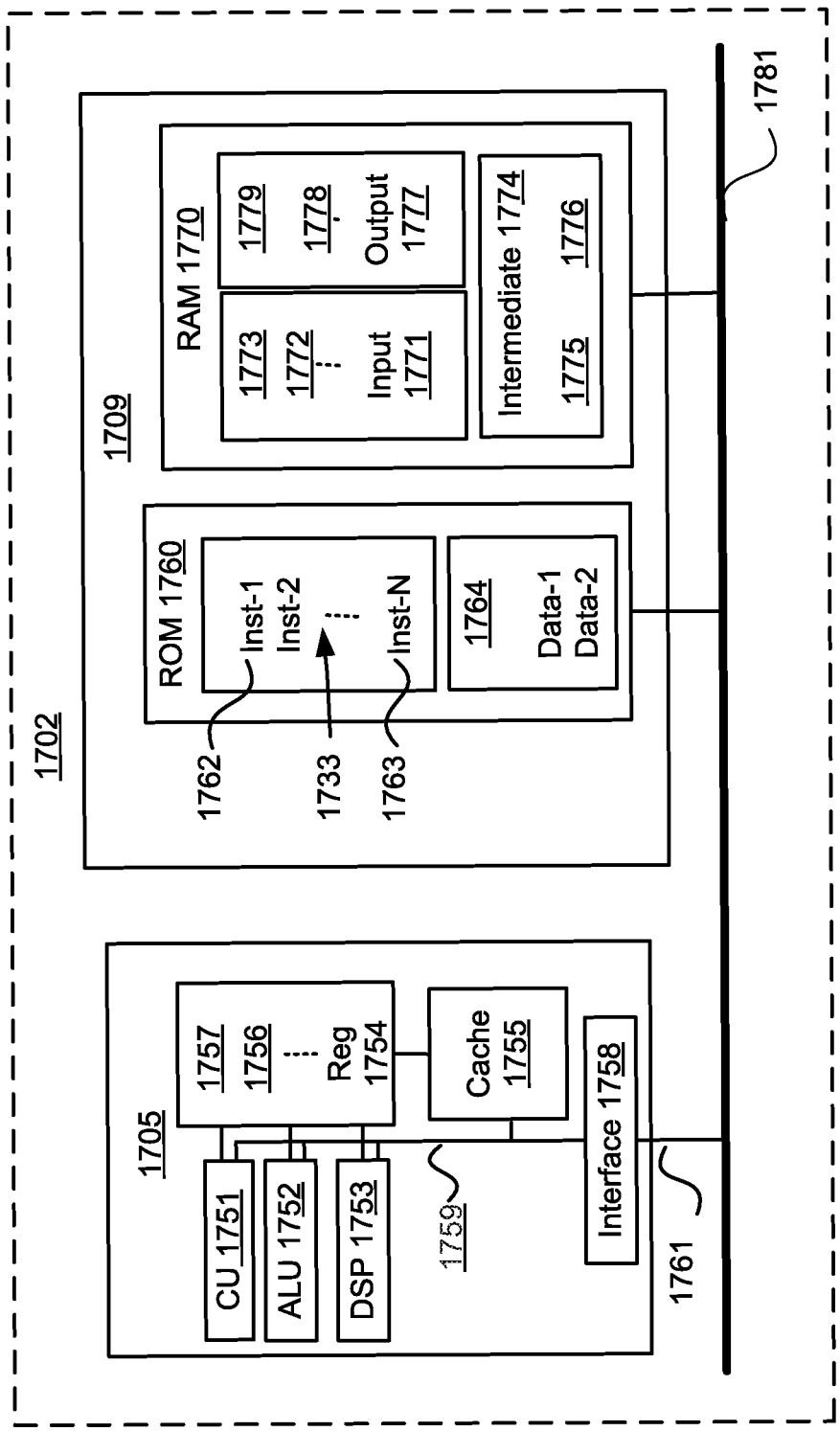

FIGS. 17A and 17B collectively form a schematic block diagram of a general purpose electronic device 1701 including embedded components, upon which the methods to be described are desirably practiced. In the examples described the electronic device 1701 is a digital video camera or another image capture device suitable for capturing digital image sequences. However, the electronic device 1701 may also be, for example, a mobile phone, a portable media player or another device in which processing resources are limited. Nevertheless, the methods to be described may also be performed on higher-level devices such as desktop computers, server computers, and other such devices with significantly larger processing resources.

As seen in FIG. 17A, the electronic device 1701 comprises an embedded controller 1702. Accordingly, the electronic device 1701 may be referred to as an "embedded device." In the present example, the controller 1702 has a processing unit (or processor) 1705 which is bi-directionally coupled to an internal storage module 1709. The storage module 1709 may be formed from non-volatile semiconductor read only memory (ROM) 1760 and semiconductor random access memory (RAM) 1770, as seen in FIG. 17B. The RAM 1770 may be volatile, non-volatile or a combination of volatile and non-volatile memory.

The electronic device 1701 includes a display controller 1707, which is connected to a video display 1714, such as a liquid crystal display (LCD) panel or the like. The display controller 1707 is configured for displaying graphical images on the video display 1714 in accordance with instructions received from the embedded controller 1702, to which the display controller 1707 is connected.

The electronic device 1701 also includes user input devices 1713 which are typically formed by keys, a keypad or like controls. In some implementations, the user input devices 1713 may include a touch sensitive panel physically associated with the display 1714 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 17A, the electronic device 1701 also comprises a portable memory interface 1706, which is coupled to the processor 1705 via a connection 1719. The portable memory interface 1706 allows a complementary portable memory device 1725 to be coupled to the electronic device 1701 to act as a source or destination of data or to supplement the internal storage module 1709. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 1701 also has a communications interface 1708 to permit coupling of the device 1701 to a computer or communications network 1720 via a connection 1721. The connection 1721 may be wired or wireless. For example, the connection 1721 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 1701 is configured to perform some special function. The embedded controller 1702, possibly in conjunction with further special function components 1710, is provided to perform that special function. In the example described, where the device 1701 is a digital video camera, the components 1710 may represent a lens, focus control and image sensor of the camera. The special function components 1710 are connected to the embedded controller 1702. As another example, the device 1701 may be a mobile telephone handset. In this instance, the components 1710 may represent those components required for communications in a cellular telephone environment. Where the device 1701 is a portable device, the special function components 1710 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 1702, where the processes of FIGS. 2, 7-10, 12 and 14-16 may be implemented as one or more software application programs 1733 executable within the embedded controller 1702. The electronic device 1701 of FIG. 17A implements the described methods. In particular, with reference to FIG. 17B, the steps of the described methods are effected by instructions in the software 1733 that are carried out within the controller 1702. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1733 of the embedded controller 1702 is typically stored in the non-volatile ROM 1760 of the internal storage module 1709. The software 1733 stored in the ROM 1760 can be updated when required from a computer readable medium. The software 1733 can be loaded into and executed by the processor 1705. In some instances, the processor 1705 may execute software instructions that are located in RAM 1770. Software instructions may be loaded into the RAM 1770 by the processor 1705 initiating a copy of one or more code modules from ROM 1760 into RAM 1770. Alternatively, the software instructions of one or more code modules may be pre-installed in a non-volatile region of RAM 1770 by a manufacturer. After one or more code modules have been located in RAM 1770, the processor 1705 may execute software instructions of the one or more code modules.

The application program 1733 is typically pre-installed and stored in the ROM 1760 by a manufacturer, prior to distribution of the electronic device 1701. However, in some instances, the application programs 1733 may be supplied to the user encoded on one or more CD-ROM (not shown) and read via the portable memory interface 1706 of FIG. 17A prior to storage in the internal storage module 1709 or in the portable memory 1725. In another alternative, the software application program 1733 may be read by the processor 1705 from the network 1720, or loaded into the controller 1702 or the portable storage medium 1725 from other computer readable media. Computer readable storage media refers to any non-transitory tangible storage medium that participates in providing instructions and/or data to the controller 1702 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1701. Examples of transitory or non-tangible computer readable transmission media that may also participate in the provision of software, application programs, instructions and/or data to the device 1701 include radio or infrared transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1733 and the corresponding code modules mentioned above may be executed to implement one or more graphical user interfaces (GUIs) to be rendered or otherwise represented upon the display 1714 of FIG. 17A. Through manipulation of the user input device 1713 (e.g., the keypad), a user of the device 1701 and the application programs 1733 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 17B illustrates in detail the embedded controller 1702 having the processor 1705 for executing the application programs 1733 and the internal storage 1709. The internal storage 1709 comprises read only memory (ROM) 1760 and random access memory (RAM) 1770. The processor 1705 is able to execute the application programs 1733 stored in one or both of the connected memories 1760 and 1770. When the electronic device 1701 is initially powered up, a system program resident in the ROM 1760 is executed. The application program 1733 permanently stored in the ROM 1760 is sometimes referred to as "firmware". Execution of the firmware by the processor 1705 may fulfil various functions, including processor management, memory management, device management, storage management and user interface.

The processor 1705 typically includes a number of functional modules including a control unit (CU) 1751, an arithmetic logic unit (ALU) 1752, a digital signal processor (DSP) 1753 and a local or internal memory comprising a set of registers 1754 which typically contain atomic data elements 1756, 1757, along with internal buffer or cache memory 1755. One or more internal buses 1759 interconnect these functional modules. The processor 1705 typically also has one or more interfaces 1758 for communicating with external devices via system bus 1781, using a connection 1761.

The application program 1733 includes a sequence of instructions 1762 though 1763 that may include conditional branch and loop instructions. The program 1733 may also include data, which is used in execution of the program 1733. This data may be stored as part of the instruction or in a separate location 1764 within the ROM 1760 or RAM 1770.

In general, the processor 1705 is given a set of instructions, which are executed therein. This set of instructions may be organised into blocks, which perform specific tasks or handle specific events that occur in the electronic device 1701. Typically, the application program 1733 waits for events and subsequently executes the block of code associated with that event. Events may be triggered in response to input from a user, via the user input devices 1713 of FIG. 17A, as detected by the processor 1705. Events may also be triggered in response to other sensors and interfaces in the electronic device 1701.

The execution of a set of the instructions may require numeric variables to be read and modified. Such numeric variables are stored in the RAM 1770. The disclosed method uses input variables 1771 that are stored in known locations 1772, 1773 in the memory 1770. The input variables 1771 are processed to produce output variables 1777 that are stored in known locations 1778, 1779 in the memory 1770. Intermediate variables 1774 may be stored in additional memory locations in locations 1775, 1776 of the memory 1770. Alternatively, some intermediate variables may only exist in the registers 1754 of the processor 1705.

The execution of a sequence of instructions is achieved in the processor 1705 by repeated application of a fetch-execute cycle. The control unit 1751 of the processor 1705 maintains a register called the program counter, which contains the address in ROM 1760 or RAM 1770 of the next instruction to be executed. At the start of the fetch execute cycle, the contents of the memory address indexed by the program counter is loaded into the control unit 1751. The instruction thus loaded controls the subsequent operation of the processor 1705, causing for example, data to be loaded from ROM memory 1760 into processor registers 1754, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1733, and is performed by repeated execution of a fetch-execute cycle in the processor 1705 or similar programmatic operation of other independent processor blocks in the electronic device 1701.

Figure 2:
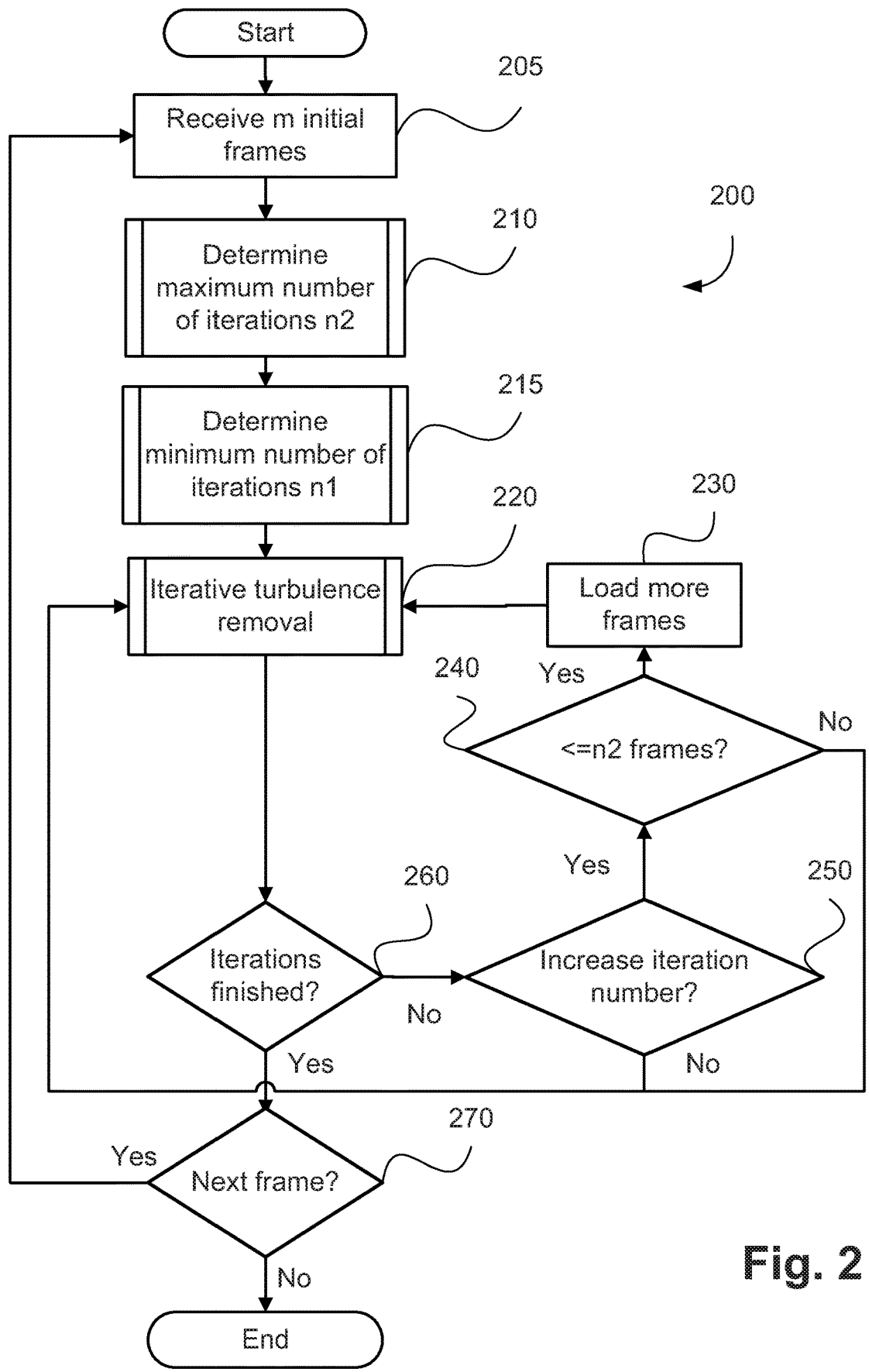
FIG. 2 shows a method of adaptive image quality improvement process for turbulence image capture devices.

FIG. 2 shows a method 200 of performing video stabilization for a given image frame captured by the device 1701. The method 200 is executed to remove or correct turbulence in a time ordered sequence of image frames of a video. The method 200 is typically implemented as one or more modules of the application 1733, stored in the memory 1709 and controlled under execution of the processor 1705.

The method 200 starts at a receiving step 205. Step 205 executes to receive m initial image frames captured by the image sensor of the components 1710. Step 205 can also relate to retrieving the images from a memory of the electronic device 1701. The number of frames loaded in step 205 is an initial estimate. For example, a typical value for m could be 5 to 8, depending on the application and system hardware. The initial estimate m can be based upon experimentation or previous results.

The method 200 continues from step 205 to a determining step 210. In execution of step 210, a maximum number of total iterations $n_2$ is determined. The maximum iteration number $n_2$ is determined based on a hardware limit and system performance requirement of the module 1701.

The method 200 continues from step 210 to a determining step 215. Step 215 executes to determine a minimum number of iterations $n_1$. The number of iterations $n_1$ is determined based on an estimate of a necessary amount of turbulence correction. In determining the maximum and minimum iterations, steps 210 and 215 operate to determine a number of iterations required to achieve a desired amount of turbulence removal for a latency constraint and an available memory capacity of the device 1701 implementing the turbulence removal.

After the minimum and maximum number of total iterations are determined, the method 200 continues from step 215 to a turbulence removal step 220. Execution of step 220 applies an iterative deblurring algorithm to correct (remove) the turbulence effect by removing spatial blur and geometric distortion. An iteration loop started by step 220 starts off on the basis of implementing the minimum total iteration number $n_1$ from step 215 as the total number of iterations n, loading corresponding image frames for each iteration. The current iteration number is used to determine a minimum set of frames to be used to generate a turbulence corrected (turbulence removed) frame. Dependent upon the iteration, the minimum set of frames typically comprises a minimum number of captured image frames of the video, a number of corrected image frames generated in an intermediate iteration and a previous or initial corrected image frame. The set of image frames required for correction is described further in relation to FIGS. 3 and 4. While the iterative loop beginning at step 220 commences based upon implementing $n_1$ iterations, the total iteration number n can be updated while the overall iterative correction is carried out.

Step 220 represents a single iteration of deblurring. Step 220 operates to store the minimum set of frames in a fast portion of available memory of the device 1701 such as the RAM 1770 or a cache of the memory 1709. Step 220 further executes to perform a turbulence removal method to the frame as described in relation to FIG. 9.

After each iteration of step 220, the method 200 proceeds to a check step 260. Step 260 checks if the set total number of iterations n is reached. The set total number of iterations n is initially set to n1. If the set total number of iterations n is already reached ("Yes" at step 260), the iteration finishes for current frame and the method 200 proceeds to a check step 270. Step 270 checks if a next frame is available to deblur. If a next (subsequent) frame of the video sequence is available ("Yes" at step 270), the method 200 returns to step 205. If a next frame is not available ("No" at step 270) the method 200 ends.

Returning to step 260, if iterations are not finished ("No" at step 260), the method 200 goes on to a check step 250. The step 250 checks if increasing the iteration number is necessary. A method of determining if more iterations are required, as implemented at step 205, is described in relation to FIG. 12. If the evaluation in step 250 indicates that more iterations are needed ("Yes" at step 250), the total iteration number n is increased by 1 and the method 200 continues to a check step 240. Step 240 checks if the current total iteration number n is greater than the maximum iteration number $n_2$. If $n<n_2$ ("Yes" at step 240), the method 200 continues to a method step 230. Step 230 loads the next frame(s) required for the iteration and the method 200 continues to step 220. Step 220 is repeated to apply turbulence removal to the most recently loaded frame.

If the evaluation in step 250 indicates that the total iteration number n does not need to be updated ("No" at step 250), the method 200 goes back to step 220 to repeat the turbulence removal step. Similarly, if step 240 finds that the current total iteration number $n \geq n_2$ ("No" at step 240), no extra frames are loaded and the method 200 goes back to step 220.

Step 250 considers the case where the total iteration number needs to be increased. The total iteration number is not reduced at step 250. The total iteration number for each frame starts at the minimum iteration number $n_1$, while at every iteration step 250 determines if the number goes up by 1, the total iteration number will never exceed the maximum number $n_2$.

The process in FIG. 2 ends after step 270 determines that there are no more frames to process or if the real-time long distance image capture system is turned off.

In an iterative video quality improvement method, if the current frame is corrected or improved using neighbouring frames, more iterations means more neighbouring frames will be involved. The total iteration number is directly proportional to the number of past or future frames involved in the correction algorithm. Therefore, a large total iteration number leads to the processing and loading of a large number of past or future frames.

Figure 5:
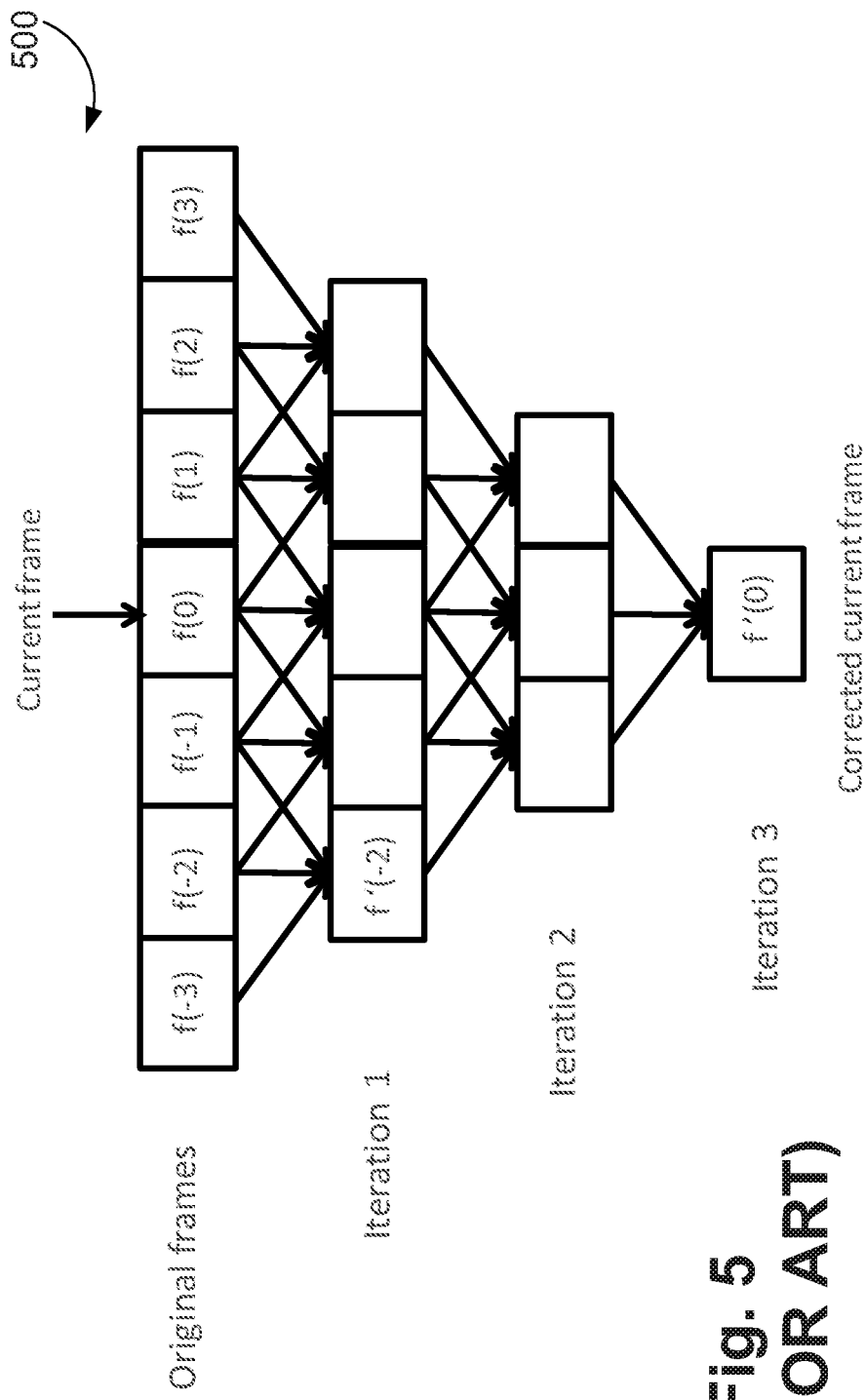
FIG. 5 illustrates a relationship between number of iterations needed and number of frames required in an iterative video quality improvement method.

FIG. 5 illustrates a relationship diagram 500 between the number of frames used and the total iteration number n in a previously known solution. The diagram 500 shows original frames f(−3) to f(3). The original frames are combined to from Iteration 1. The results of Iteration 1 are combined to form Iteration 2. The results of Iteration 2 are combined to provide Iteration 3 with corrected frame $f'(0)$. In order to produce the corrected current frame $f'(0)$ in 3 iterations with each iteration utilizing 1 past frame, the current frame and 1 future frame, a total of seven (7) original frames are loaded initially. In FIG. 5, each frame is updated with a certain combination of that frame's neighbouring frames. For example, $f'(−2)$ in Iteration 1 is updated using a combination of $f(−3)$, $f(−2)$ and $f(−1)$. Further details of how the frames can be combined is described hereafter with reference to FIG. 9.

As shown in FIG. 5, that depending on the iteration method used, there can be a direct and proportional relationship between number of frames needed and the total iteration number n. In the example described, in order to speed up convergence and reduce memory requirements, a new iteration scheme is used.

Figure 3:
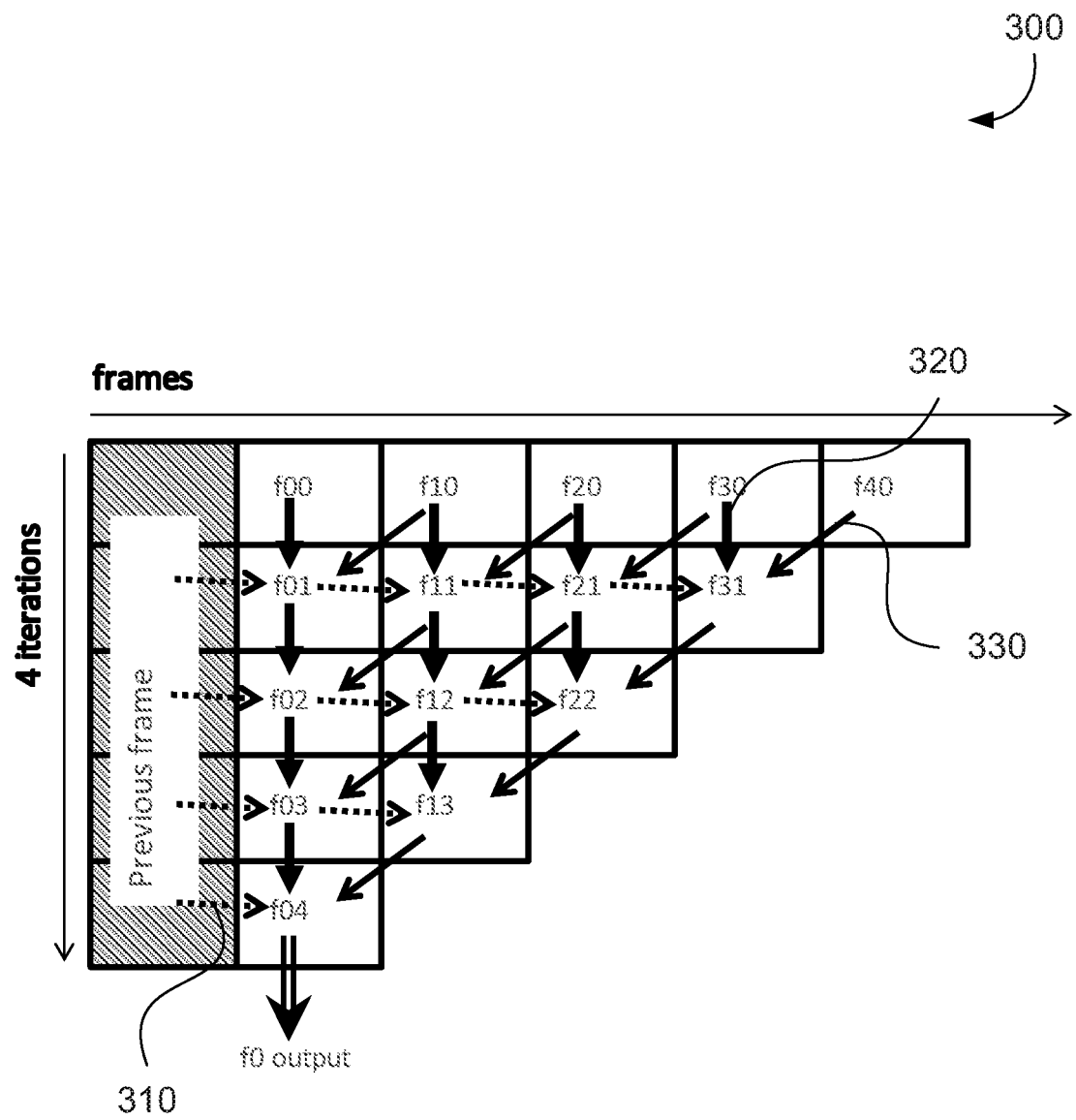
FIG. 3 shows an iteration structure of video frames and iteration numbers.
Figure 4:
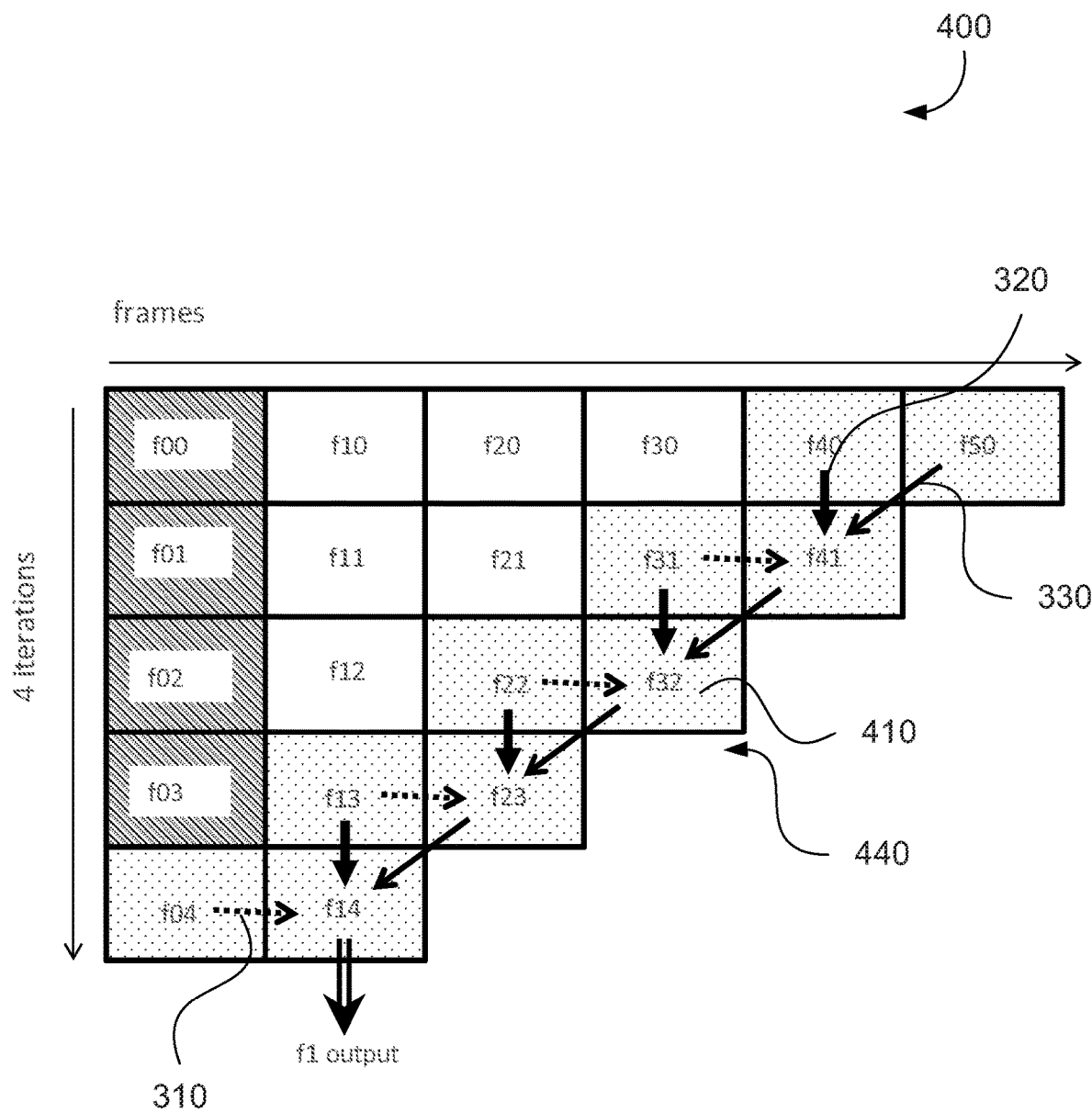
FIG. 4 demonstrates a memory requirement and iteration structure of subsequent frames once the turbulence video improvement processed has been bootstrapped.

FIG. 3 shows a structure 300 illustrating an example of the iteration method described with 4 iterations. To correct a current turbulence frame $f_{00}$, four (4) future frames $f_{10}$ $f_{20}$, $f_{30}$ and $f_{40}$ are loaded. In the examples of FIGS. 3 and 4, the subscripts of the frames all have two digits. The first digit marks the frame number and the second digit represents the iteration number. For example, $f_{21}$ is the second frame after the first iteration and $f_{00}$ is the zeroth original frame. The current frame is updated in a first iteration to produce $f_{01}$ using a combination of $f_{10}$, $f_{00}$ and a previously updated frame. The method then updates $f_{11}$, $f_{21}$ and $f_{31}$ using the same formula for $f_{01}$. After 4 iterations, $f_{04}$ is now the corrected turbulence frame. The frames $f_{01}$-$f_{31}$, $f_{02}$-$f_{22}$ and $f_{03}$-$f_{13}$ represent turbulence corrected intermediate iteration frames. Whether an iteration is considered an intermediate frame depends on the current frame number.

In FIG. 3, an arrow 320 represents the contribution from an original frame $f_{30}$ to an updated frame $f_{31}$, an arrow 330 represents the contribution from an original frame $f_{40}$ to the updated frame $f_{31}$. Similarly, an arrow 310 represents the contribution from the updated previous frame to the corrected turbulence frame $f_{04}$. The difference between the iteration schemes shown in FIG. 5 and FIG. 3 is the use of information from previously corrected frames. The method used in FIG. 5 updates the current frame using frames from the last iteration while the method in FIG. 3 applies the newly updated (turbulence removed) previous frame as soon as the newly updated frame is available. Using the newly updated previous frame as shown in FIG. 3 improves the convergence speed to generating a final corrected output frame.

Furthermore, for a real-time video surveillance system, memory efficiency is often of great importance. Once the iteration scheme in FIG. 3 is started, relatively few frames are required to be stored in the fast core memory to produce subsequent corrected frames, thus providing an efficient solution for real-time systems that require complex computation. As a bootstrapping step, the corrected current frame $f_{04}$ can be updated using just updated current frames $f_{00}$, $f_{01}$, $f_{02}$, $f_{03}$ and future frames $f_{10}$, $f_{11}$, $f_{12}$ and $f_{13}$, instead of including any 'previous frames' of the video sequence in FIG. 3.

FIG. 4 demonstrates an example method 400 of generating subsequent corrected frames when some corrected frames are already available. The example in FIG. 4 also relates to 4 iterations and reflects an extension of FIG. 3. Once the corrected frame $f_{04}$ is generated, the next corrected frame $f_{14}$ can be determined by loading just one more original frame $f_{50}$ and applying the same updating scheme to the frames shown using a set of frames 440 shown in dotted rectangles (such as a frame 410) in FIG. 4. In other words, once the corrected current frame $f_{04}$ is generated, only $f_{40}$, $f_{31}$, $f_{22}$, $f_{13}$ and $f_{04}$ need to be kept in the core memory before loading a new original frame $f_{50}$ for subsequent turbulence removal calculation. In the example in FIG. 4 with 4 iterations, only a total of 10 frames need to be stored to produce the next corrected frame. Resultantly, the total number of frames stored is s=2 (n+1) where n is the total iteration number.

In order to bootstrap the frame combination methods described, more frames are needed initially. For example, the triangular structure 300 in FIG. 3 is needed to start the turbulence removal. However, since the bootstrap step is only performed once in a video surveillance task, the bootstrap step can either be done quickly in the core memory or implemented outside of the fast core memory of the system to avoid occupying a relatively large amount of room on in the core memory. Subsequent iterations can use a subset of frames such the frames of the region 440.

Accordingly, for each iteration of turbulence removal, a minimum set of frames can be determined based upon the number of required iterations n required to achieve the desired amount of turbulent removal. The minimum set of frames relates to the current iteration number (for example the first iteration uses the bootstrap method described above) as well as the number of iterations determined (the minimum number of iterations $n_1$ or if an iteration is added at step 250). The minimum frame set can include the initial corrected frame, frames corrected in intermediate iterations and future or subsequent frames of the video sequence (such as $f_{50}$ in FIG. 4). In the bootstrapping scenario the initial frame may not be available and the number of intermediate corrected frames can be zero. The initial corrected frame relates to a turbulence corrected image frame of the current iteration that relates to a frame preceding the current frame in the time ordered video sequence (the current frame being the subsequent or net frame of the sequence). An example of an initial corrected frame is 310 used in correction of frame 1 in the fourth iteration of FIG. 4.

An example of frames corrected in an intermediate iteration is the frames $f_{13}$ and $f_{23}$ FIG. 4 which are intermediate in comparison with the fourth iteration of FIG. 4. Image frames corrected in an intermediate iteration are frames corrected in an iteration previous to the current iteration for the current frame.

As shown in FIG. 4 the resultant corrected frame for the fourth iteration is (i) the initial corrected image ($f_{04}$), (ii) a corrected image of the subsequent frame from an intermediate iteration immediately preceding the current iteration ($f_{13}$) and (ii) and an image frame for a next subsequent image in the sequence as corrected in the previous iteration ($f_{23}$).

One important advantage of the triangular structure 300 in FIG. 3 is the flexibility and efficiency the structure provides in a real-time system. In using frames based on the structure 300 or 400 and within the maximum iteration number n2, the method 200 can be implemented in real-time or near real-time.

Figure 6:
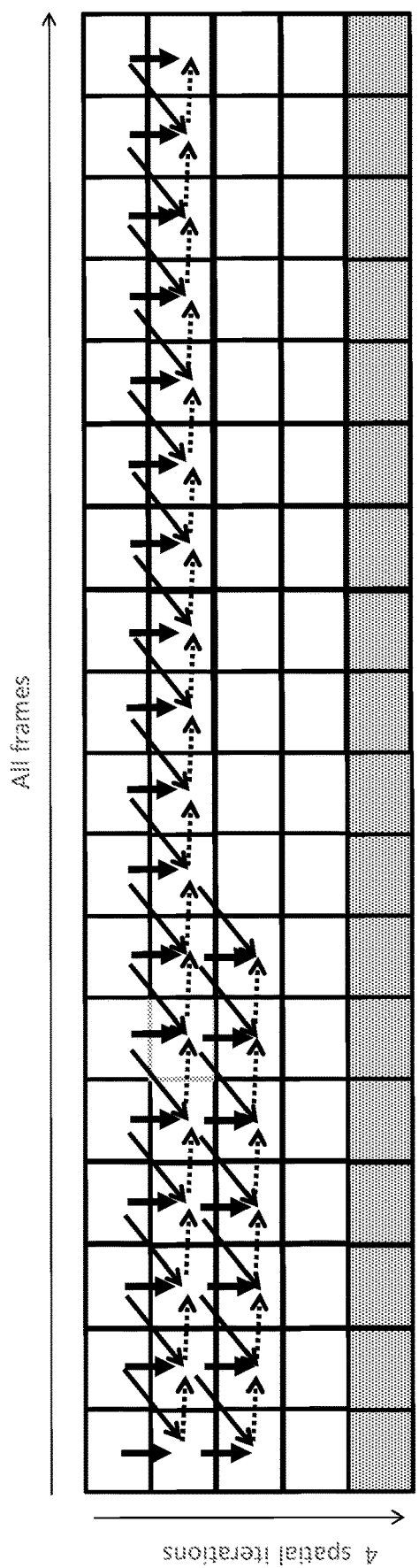
FIG. 6 shows an iteration structure of a method for turbulence effect removal.

A traditional post processing video quality improvement method can involve taking in a large number of frames and process all frames at once. FIG. 6 shows a structure 600 illustrating an example of a traditional post processing iteration method. Assuming 4 iterations, the method used in FIG. 6 loads many frames in the memory and iterates through all the loaded frames. Once the first iteration is completed, only the results in the first iteration are saved. The original frames are discarded. After the second iteration, all results from the first iteration are discarded and so on. For example, if 200 frames are to be processed, 200 frames have to be kept in memory at the same time. Even though the method used in the structure 600 is straightforward, the method requires a relatively large amount of memory to be used therefore is typically not suitable for real-time systems. The structures 300 and 400 do not require such a large amount of frames to be stored.

Importantly, turbulence effect varies randomly. The resultant spatial blurring and geometric distortion effect on surveillance videos can change quickly from frame to frame. Consequently the amount of turbulence correction needed for a long distance surveillance video varies while new frames are still being captured. Using the triangular structure 300 shown in FIG. 3 and the diagonal structure 440 (dotted rectangles) shown in FIG. 4, the total iteration number can be updated while an iteration is being implemented.

Figure 11:
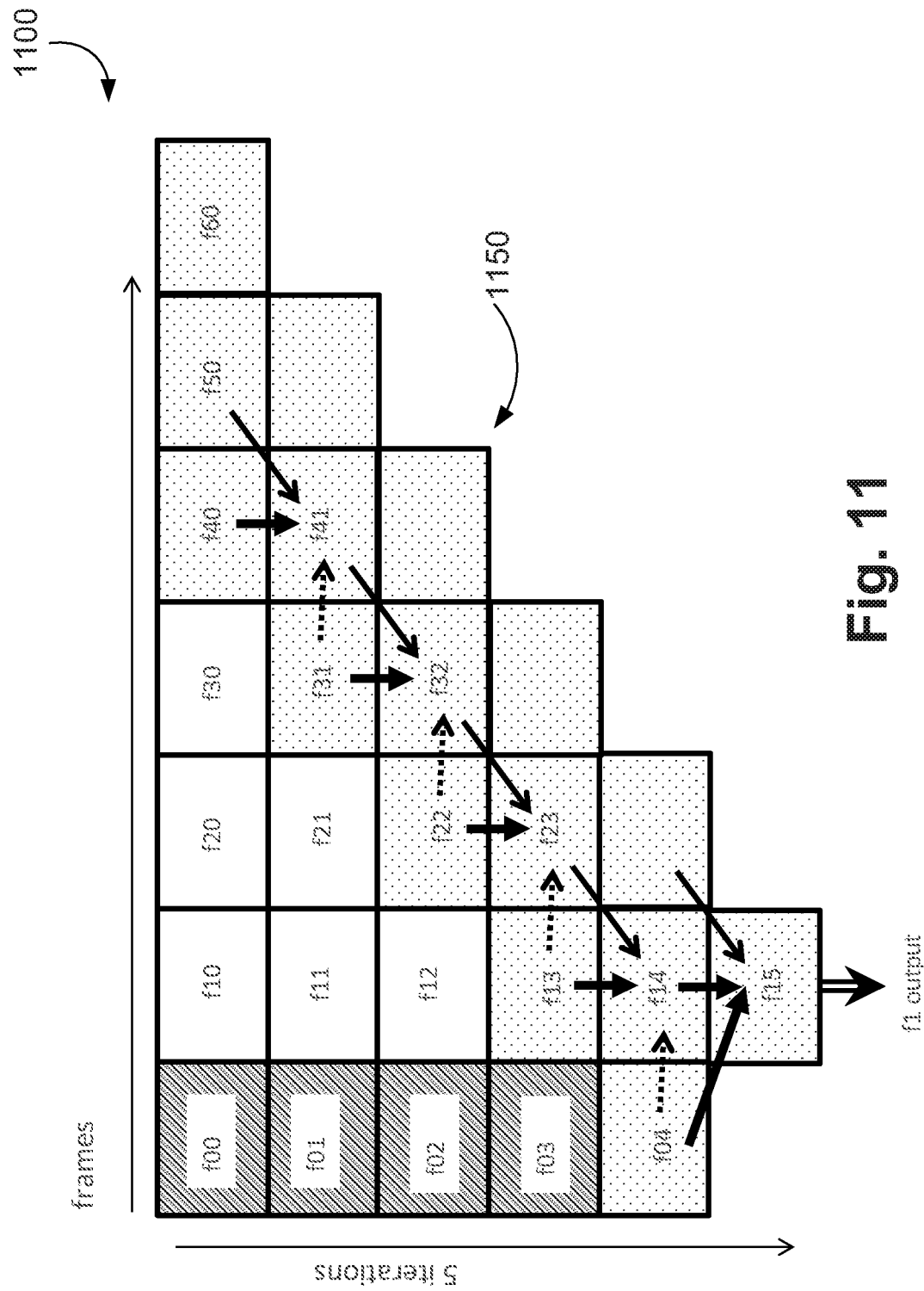
FIG. 11 shows a flow diagram of memory usage in a case where neighbouring frames have different numbers of required iterations.

FIG. 11 shows a structure 1100 illustrating an example of the variable total iteration number n. In the example of FIG. 11, while determining the $4^{th}$ iteration $f_{14}$ for frame 1, the adaptive evaluation method 200 finds at step 250 that more turbulence correction is needed due to underestimation of the turbulence strength in frame 1. Therefore, one (1) more iteration is required. To add one (1) more iteration, the method 200 at step 230 loads one (1) extra frame $f_{60}$ and uses a diagonal structure 1150, shown in dotted rectangles, to determine the fifth iteration in order to generate the updated frame $f_{15}$. The adaptive evaluation method illustrated in FIG. 11 is described in detail with reference to FIG. 12.

Because the increase in iteration number is introduced for the determination of frame $f_{10}$, which happens after the determination of frame $f_{00}$, there is no $f_{05}$ available. As indicated in FIG. 11, the fifth iteration result of frame $f_{10}$ uses $f_{04}$ instead of $f_{05}$ in combination with $f_{14}$ and $f_{24}$. Effectively, the structure 100 uses a corrected version of a previous image frame of the video sequence (frame $f_{04}$ relates to correction of frame 0) from a previous iteration (frame $f_{04}$ relates to iteration 4 rather than iteration 5) instead of a previously corrected version of the current frame (frame 1) from a current iteration (iteration 5). Use of the frame $f_{04}$ as correction of the current frame at the current iteration affects the iteration results but the effect on data stored in the memory is minimised as $f_{04}$ is only one iteration away from $f_{05}$.

FIG. 4 shows an example where the next frame $f_{10}$ requires the same iteration number as frame $f_{00}$. On the other hand, FIG. 11 shows an example where the next frame $f_{110}$ requires a larger iteration number than $f_{00}$. In FIG. 11, the number of frames required in the core memory becomes s=3 (n+1)+1 where n is the previously set iteration number, in the example shown four (4). In general, based upon adding a single iteration at a time, the frames required in the core memory can vary from a minimum of 2(n+1) to a maximum of $$2(n_1+1) + \frac{(n_2-n_1)(2n_1+3+n_2-n_1)}{2}.$$

Accordingly, if an iteration is added, the minimum frame set required can be increased.

For example, if the maximum iteration number $n_2$ determined in step 210 is 8, the minimum iteration number $n_1$ determined in step 215 is 4 and the previously set iteration number n for frame $f_{00}$ is the same as the minimum number $n_1$, then to correct $f_{10}$, the core memory has to keep at least 10 frames and at most 40 frames. Because the video quality of neighbouring frames typically varies relatively slowly, especially for videos with fast frame rate, the likelihood for one frame to require the minimum iteration number and the next frame to require the maximum iteration number is relatively low. A more typical difference in required iteration number between two consecutive frames would be around 1 or 2. In the example described, only 16 to 23 frames are needed if the previously set iteration number n for frame $f_{00}$ is 4.

In the case where the next frame $f_{10}$ requires fewer iterations than the current frame $f_{00}$, the number of frames stored in the core memory follows the same pattern as the case above where $f_{10}$ requires more iterations than $f_{00}$.

For a real-time surveillance system, in order to react promptly to unexpected events, a latency requirement often exists. In other words, any video quality improvement processing steps should be done in real-time with an upper limit for delay (latency). For example, the latency requirement for a long distance surveillance system implemented on the camera 1701 could be 1 second. The latency requirement of 1 second includes processing time and frame retrieval time. Processing time is the time spent by the system 1701 to apply the turbulence correction algorithm and frame retrieval time is the time spent to capture and load frames. For example, if the frame rate of a particular long distance surveillance system with turbulence removal is 10 frames per second (FPS), with a 1 second latency requirement, the turbulence correction algorithm is limited to using 10 future frames. If the algorithm waits for the $11^{th}$ future frame to determine the turbulence correction, the corrected frame will be generated more than 1 second later than the time the original frame was captured. The latency requirement is therefore not met. In summary, the combined effect of latency requirement and the system frame rate limits the maximum number of frames the system can use, thus limits the maximum iteration number $n_2$.

In addition, the maximum number of frames loaded in the system, consequently the maximum iteration number $n_2$ is also limited by the available fast storage (such as the RAM 1770 or a cache of the memory 1709) in the system 1701. For example, a GPU (graphics processing unit) with 2 GB global memory can load at most 21 frames of HD (high definition) video at 1920×1080 resolution if each pixel of the video is expressed in RGB channels and has complex double precision floating point values.

Figure 8:
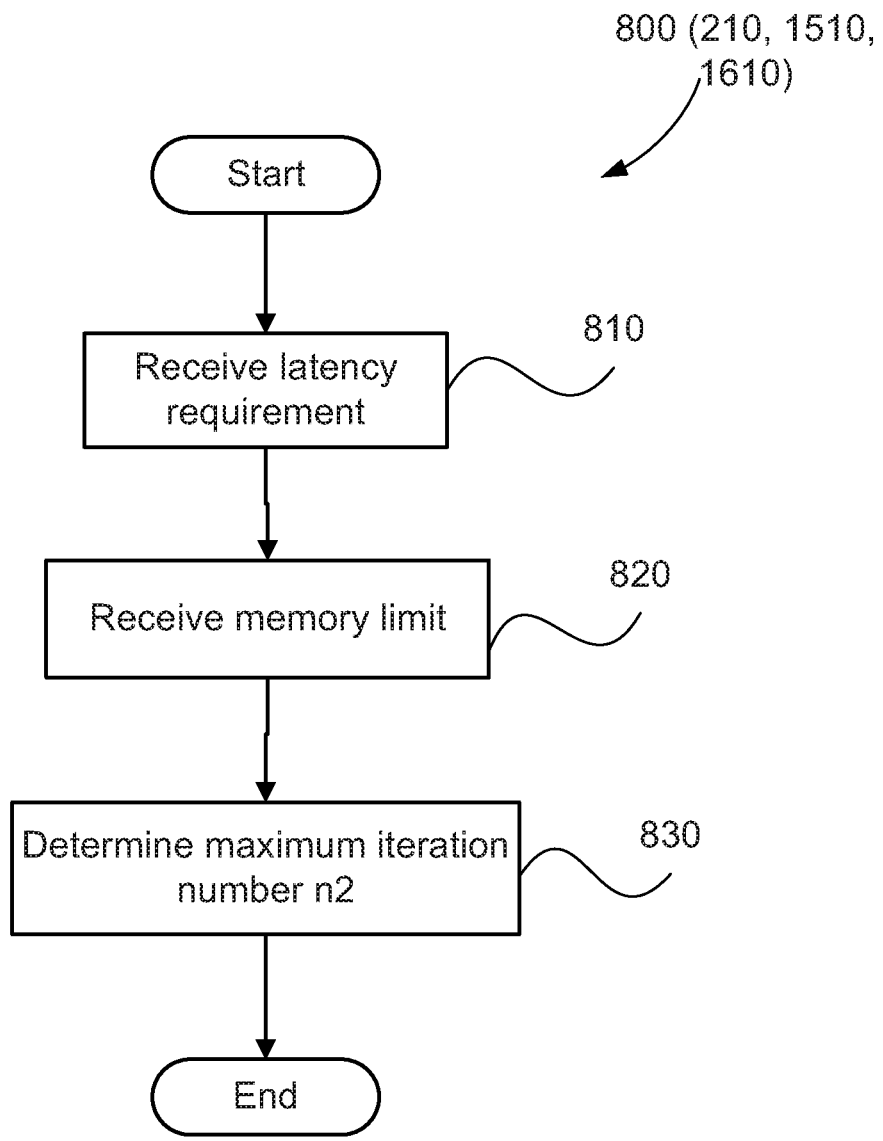
FIG. 8 shows a method of determining a maximum iteration number $n_2$.

FIG. 8 shows a method 800 of determining the maximum iteration number $n_2$, as implemented at step 210 of FIG. 2.

The method 800 is typically implemented as one of more modules of the application 1733, stored in the memory 1709 and controlled under execution of the processor 1705.

The method 800 beings at a receiving step 810. Step 810 receives the latency requirement via a query sent to the processor 1705. The method 800 continues from step 810 to a receiving step 820. Step 820 receives the memory limit of the system 1701 via a query sent to the processor 1705.

The method 800 continues from step 800 to a determining step 830. Execution of step 830 determines the maximum iteration number $n_2$ based on the maximum number of frames that can be loaded into the system and used for turbulence correction calculation. The maximum number of frames that is allowed by both the latency requirement in 810 and the memory limit in 820 determines the maximum iteration number $n_2$. Parameters of the frames such as resolution and size can also affect the maximum iteration number $n_2$. Using the examples above, if the system 1701 has a latency requirement of 1 second and frame rate of 10 FPS (frames per second), and the system memory 1709 allows 21 frames to be loaded at one time, then the iterative turbulence correction algorithm can possibly use 10 past frames, the current frame and 10 future frames for calculation. Depending on the iterative implementation of the turbulence correction algorithm, the number of frames can lead to different total iteration numbers. However, as described above, the total iteration number of any iterative multi-frame turbulence correction algorithm is traditionally proportional to the number of frames used in the process, as demonstrated in FIGS. 3 and 5.

In step 830, if the determined maximum iteration number $n_2$ is smaller than the number of initially loaded frames, extra frames are discarded.

Figure 7:
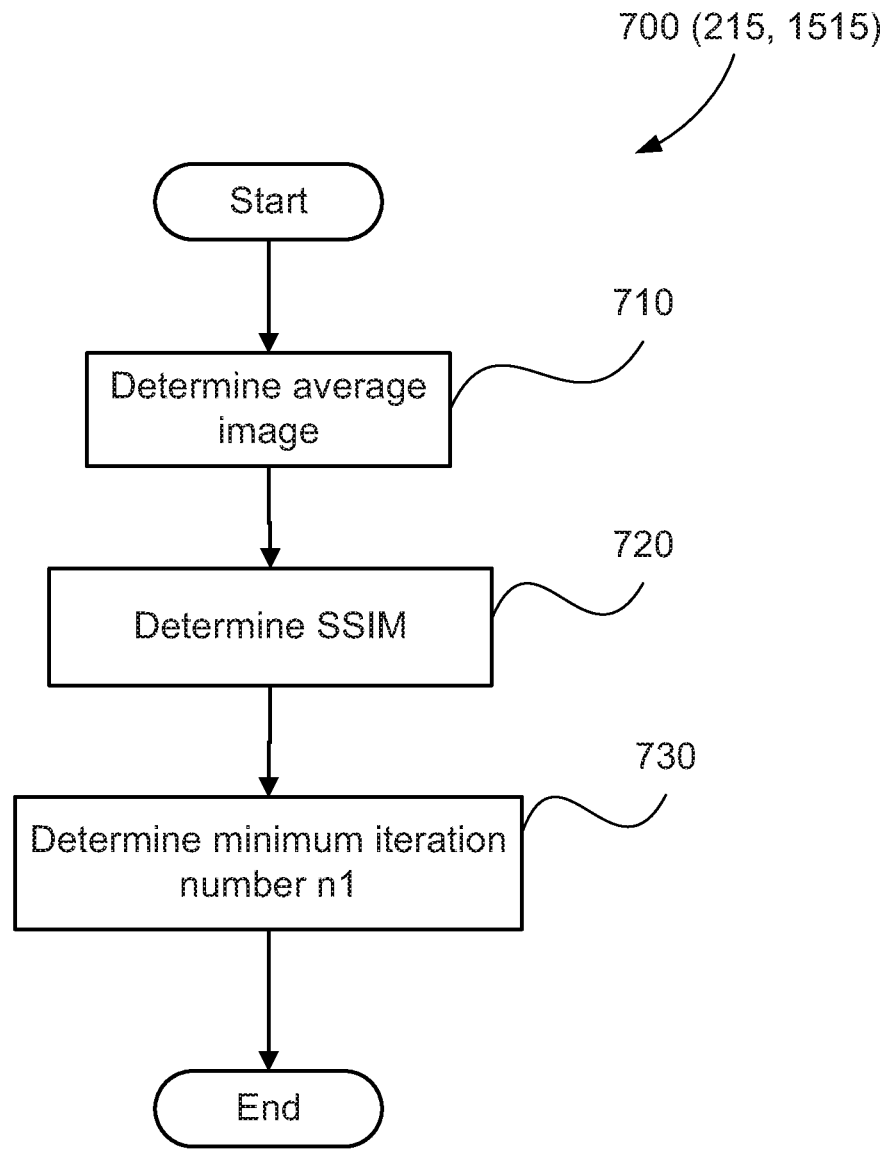
FIG. 7 shows a method of determining a minimum iteration number $n_1$.

A method 700 of determining the minimum total iteration number $n_1$, as implemented at step 215, is shown in FIG. 7. The method 700 is typically implemented as one of more modules of the application 1733, stored in the memory 1706 and controlled under execution of the processor 1705.

The method 700 starts at a determining step 710. Step 710 determines an average image across the m initial images. As described above, a typical value for m could be 5 to 8. The average image determined in execution of step 710 serves as a structural reference frame as the averaging operation maintains the turbulence free geometry of the original scene while smoothing out high frequency details. The average image can be compared to a randomly selected turbulence frame, for example the first of the m loaded initial frames to determine the minimum iteration number $n_1$.

The method 700 continues from step 710 to a determining step 720. There are many different methods to estimate the minimum iteration number $n_1$. The common purpose of the methods is to evaluate the turbulence strength and help determine corresponding amount of correction to the turbulence frames. In step 720, a structural similarity index (SSIM) is used to check the geometrical similarity between the average image from step 710 and a randomly selected turbulence frame, for example the first of the m loaded initial frames. The check provides a measure of the geometric distortion in the turbulence frame, thus gives a rough estimation of turbulence strength. The structural similarity index (SSIM) score is determined using the luminance channel of the frames to minimise computation.

In step 720, different variations of the structural similarity index (SSIM) can be used. For example, application of a gradient-based structural similarity index (G-SSIM) method, where the luminance component of structural similarity index is determined using original frames and the contrast and structural components are calculated with the gradient maps of the frames, may be suitable.

The method 700 continues from step 720 to a determining step 730. Step 730 determines the minimum iteration number n1 based on the structural similarity index score from step 720. The value of $n_1$ can be determined using a threshold. For example, if the structural similarity index score is lower than 0.7, set $n_1=5$, if the structural similarity index score is higher than 0.8, set $n_1=3$. The thresholds may be determined through experimentation. Alternatively, other methods such as a lookup table relating to acceptable structural similarity index (SSIM) scores for a particular type of image can also be used.

The minimum iteration number $n_1$ can also be determined at step 210 using alternative techniques. As long as $n_1$ is correlated with the turbulence strength from a selected frame, $n_1$ can provide a suitable estimation of the amount of turbulence correction needed. For example, a SLODAR (SLOpe Detection And Ranging) technique can be used to measure the turbulence strength and determine the minimum iteration number $n_1$. If a SLODAR is used, a lookup table may need to be used to map turbulence strength $C_n^2$ to number of iterations.

Steps 210 and 215, as implemented by the methods 700 and 800 respectively, operate to determine a number if iterations required to achieve a desired amount of turbulence removal for given constraints of the system 1701. The method 200 operates to further adapt the number of iterations during real-time turbulence removal via execution of steps 260, 250, 240 and 230.

Referring back to FIG. 2, after the maximum and minimum number of iterations have been determined in 210, step 220 performs an iteration of a turbulence correction technique. The step 200 stored the minimum frame set determined according to the iteration number. Details of the iterative turbulence removal method are described in relation to FIG. 9. Because turbulence imaging methods attempt to remove both geometric distortion and spatial blurring, including a spatial deblurring process for each frame and a temporal deblurring process.

Figure 9:
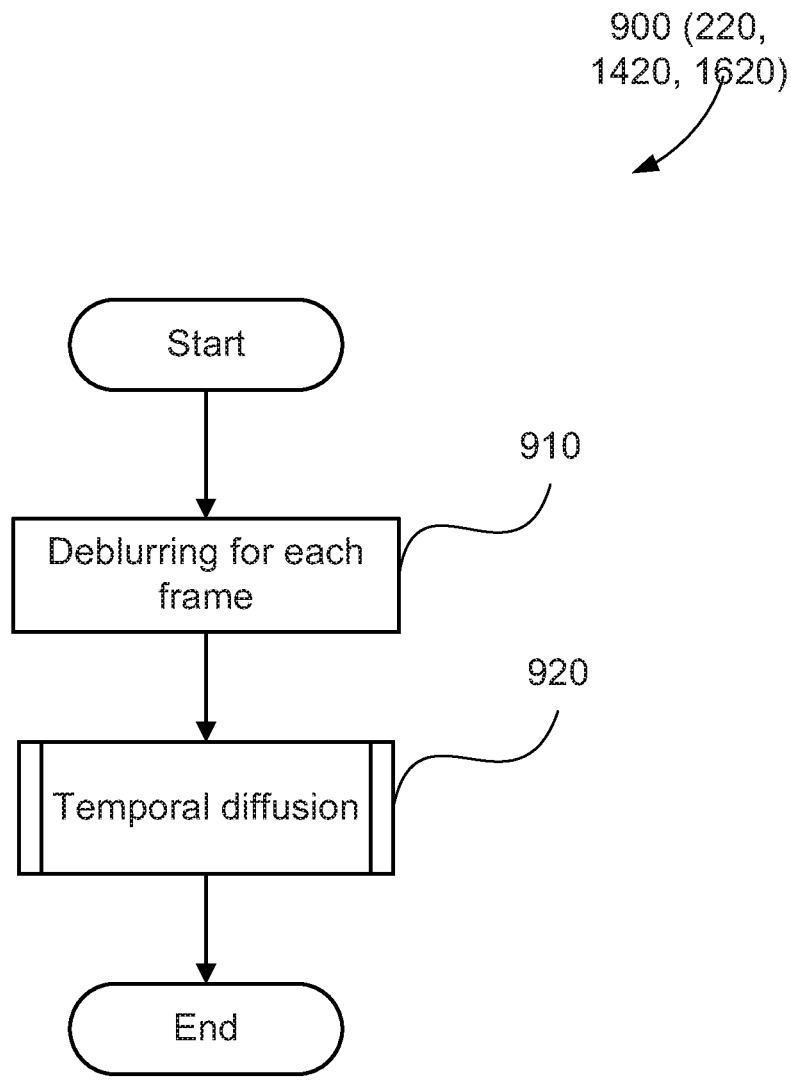
FIG. 9 shows a method of iterative deblurring including spatial deblurring and temporal diffusion.

FIG. 9 shows a method 900 removing distortion from an image, as implemented at step 220. The method 900 is typically implemented as one of more modules of the application 1733, stored in the memory 1709 and controlled under execution of the processor 1705. The method 900 begins at a deblurring step 910. Step 910 applies a spatial deblurring process for each frame.

The method 900 continues form step 910 to a diffusing step 920. Step 920 applies a temporal deblurring (diffusion) process to cancel out geometric distortion with multiple frames using the frames of the minimum frame set. In some turbulence removal algorithms, the spatial per-frame deblurring and the temporal deblurring are separate operations. In other methods, the spatial per-frame deblurring and the temporal deblurring are completed in a single operation.

Figure 13:
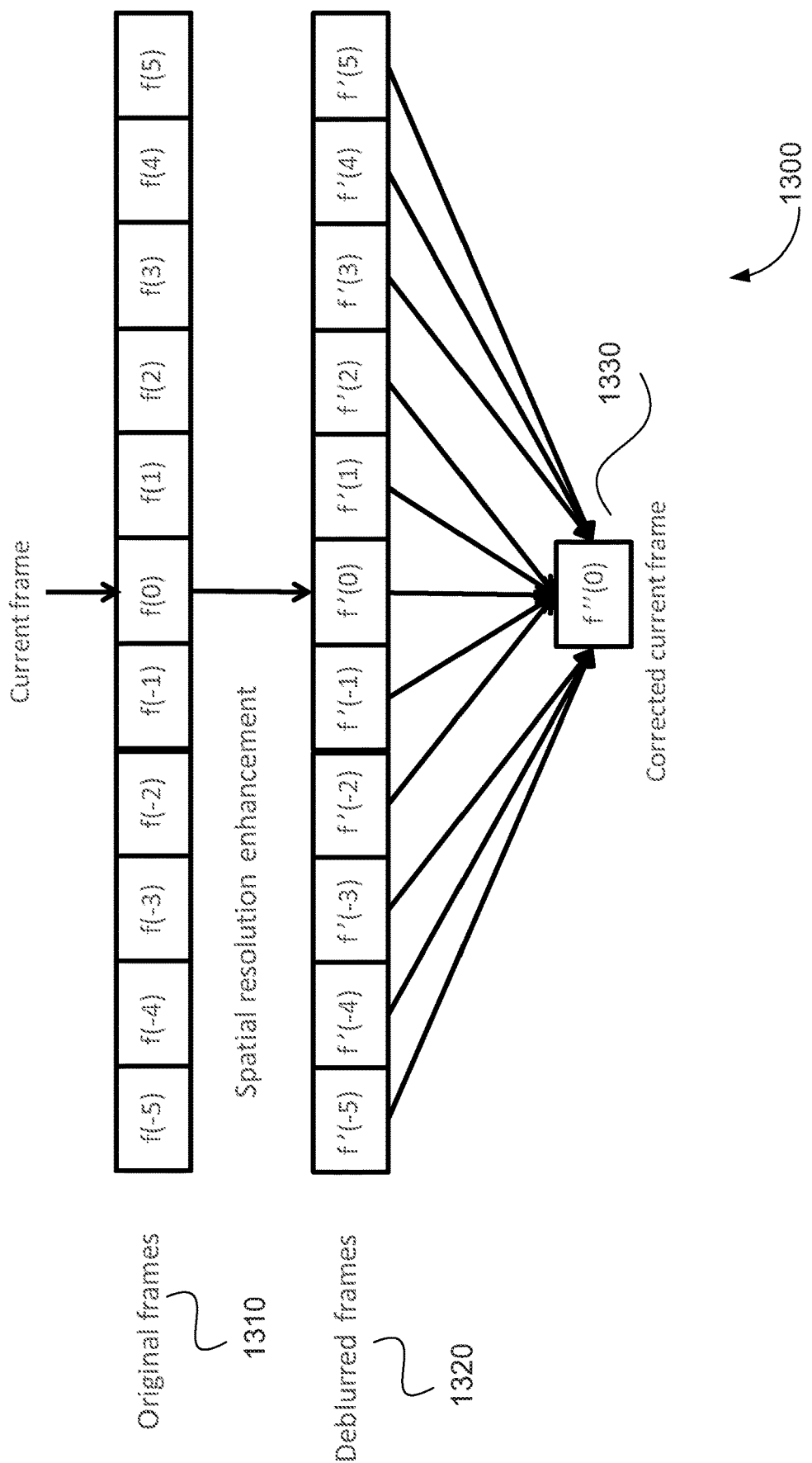
FIG. 13 shows an example of turbulence correction for one frame that utilizes spatial resolution enhancement and temporal combination of neighbouring frames.

FIG. 13 illustrates an example 1300. The example 1300 includes eleven original frames 1310, eleven deblurred frames 1320, a current frame 1311 and a current corrected frame 1330. Each of the 11 frames 1310 (from frame $f(-5)$ to frame $f(5)$) is spatially enhanced separately to provide the frames 1320, and then combined together the generate the turbulence free current frame 1330 ($f''(0)$). In other implementations, these two steps of deblurring and then combining deblurred frames can be intertwined to improve convergence. Using FIG. 3 as an example, the current frame 1311 after the first iteration, $f_{01}$, is updated according to Equation (1):

$$f_{01}=(f_{s1}+2f'_{00}+f_{10})/4 \quad (1)$$

In Equation (1) $f_{s1}$ represents the previous frame after the first iteration, $f'_{00}$ represents the current frame after the spatial deblurring step 910 and $f_{10}$ represents the original future frame.

Figure 10:
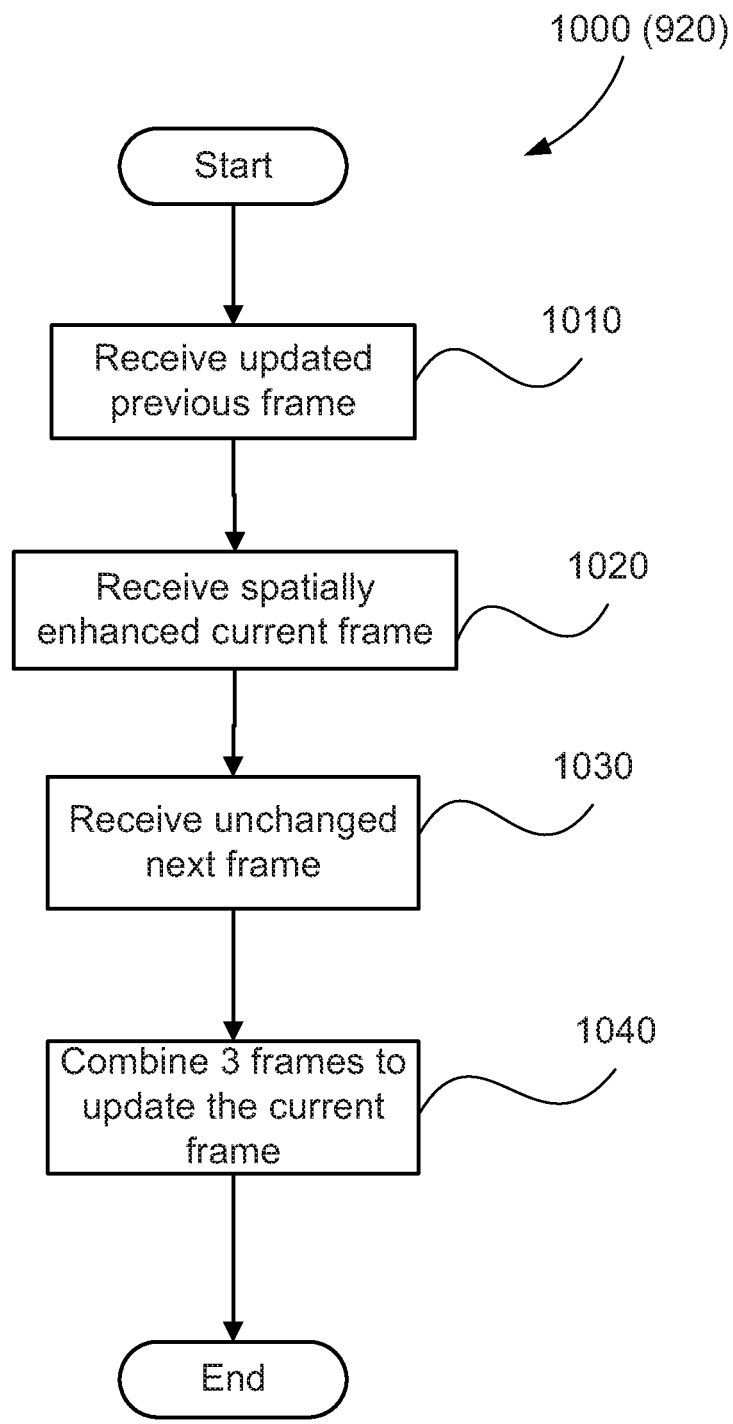
FIG. 10 shows a method of temporal diffusion as implemented in FIG. 9.

FIG. 10 shows a method 1000 of temporal diffusion, as implemented at the process step 920 and using Equation (1). The method 1000 is typically implemented as one of more modules of the application 1733, stored in the memory 1709 and controlled under execution of the processor 1705. The method 1000 begins at a receiving step 1010. Step 1010 receives the updated previous frame $f_{s1}$. The method 1000 continues from step 1010 to a receiving step 1020. Step 1020 receives the spatial enhanced current frame $f'_{00}$. The method 1000 continues from step 1020 to a receiving step 1030. Step 1030 receives the original future frame $f_{10}$. The method 1000 continues from step 1030 to a combining step 1040. The three frames $f_{s1}$, $f'_{00}$, and $f_{10}$ are combined using Equation (1) at step 1040 to generate the updated current frame $f_{01}$.

Many techniques for temporal combination of frames can be used at step 920. For example, a method can be used where the spatially enhanced current frame $f'_{00}$ is combined with temporal Laplacian filtering to include information from neighbouring frames. Different formulae can be used to replace Equation (1). As long as the spatial enhancement step 910 and temporal diffusion step 920 are included, the iterative deblurring scheme in step 220 can improve the spatial resolution and correct geometric distortion in the current frame.

Figure 12:
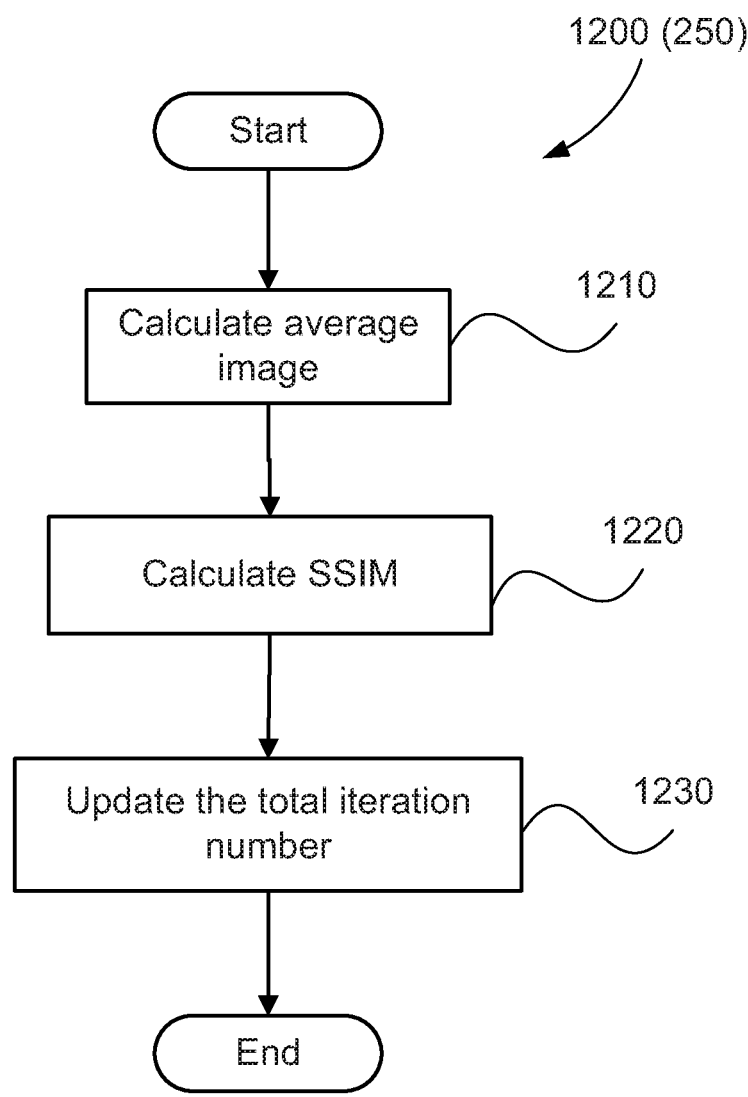
FIG. 12 shows a method of adaptive evaluation to decides if a total iteration for the current frame needs to be increased.

Referring back to FIG. 2, the adaptive evaluation step 250 uses a similar method as step 215 to decide if the total iteration number needs to be increased. A method 1200 of determining if the iteration number needs to be increased, as implemented at step 250 is shown in FIG. 12. The method 1200 is typically implemented as one of more modules of the application 1733, stored in the memory 1709 and controlled under execution of the processor 1705.

The method 1200 starts at a determining step 1210. Step 1210 determines an average image using a number of neighbouring frames around the current frame. The number of neighbouring frames can be determined via experimentation and is typically in the region of 5 to 8 frames. Because step 250 happens in the middle of the iterations for the current frame, there are no initial frames to use as in step 215. In order to provide a reasonable estimate of the geometrically correct scene using the average image, step 1210 uses the current frame at the current iteration and a few future frames at the current iteration to calculate an average image. Alternatively, step 1210 can determine an average image across a few original frames, for example $f_{00}$, $f_{01}$, $f_{02}$, $f_{03}$. Determining the average will, however, require extra storage of the original frames. Alternatively, the average determination can be done outside of the system core memory only once every few seconds to avoid excessive memory addressing and computation.

The method 1200 continues from step 1210 to a determining step 1220. Once the average image is prepared at step 1210, step 1220 determines the structural similarity index (SSIM) score in a similar manner to step 720. The method 1200 continues from step 1220 to step 1230. In order to update the total iteration number, step 1230 can use a lookup table, similarly to step 730. For example, an SSIM score of 0.7 or lower can be used as a threshold to mean the total iteration number needs to be increased by 1 or a structural similarity index (SSIM) score of 0.8 or higher can be used to mean the total iteration number does not need to be changed. As described above, step 250 will only increase the total iteration number and will never reduce the total iteration number. Preferably, step 250 only increases the total iteration number by 1 at every evaluation to avoid memory waste.

Similar to the method 700 of FIG. 7, the method 1200 of FIG. 12 can also use methods other than SSIM to estimate total iteration number. For example, SLODAR can be used to measure turbulence strength. If a SLODAR is used, a lookup table may need to be used to map turbulence strength $C_n^2$ to number of iterations.

In an alternative implementation, the total iteration number is not updated during the iterations of image improvement. Instead, a fixed total iteration number is estimated before the iterations start. The fixed number is used throughout the iterations for all frames.

Figure 14:
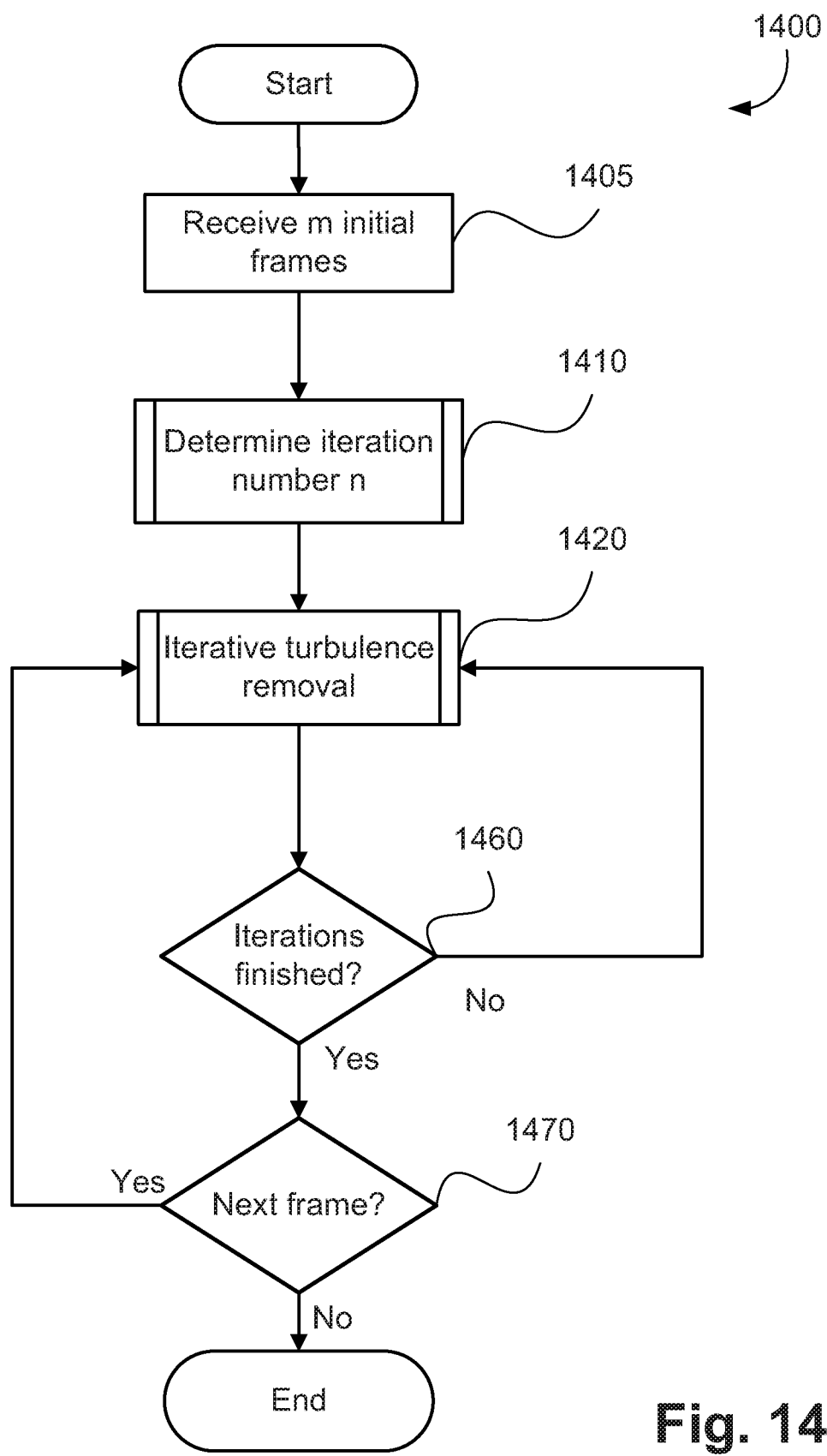
FIG. 14 shows a method of adaptive image quality improvement for turbulence image capture devices where the total iteration number does not change from frame to frame.

FIG. 14 shows a method 1400 of iterative video quality improvement using a fixed number of implementations. The method 1400 is typically implemented as one of more modules of the application 1733, stored in the memory 1709 and controlled under execution of the processor 1705.

The method 1400 begins at a receiving step 1405. Step 1405 receives first m initial frames. The number of frames loaded in step (1405) is an initial estimate. For example, a typical value for m could be 5 to 8, similarly to step 205, depending on the application and system hardware.

The method 1400 continues from step 1405 to a determining step 1410. Step 1410 determines a total iteration number n. Once the total iteration number n is determined, the method 1400 continues to a deblurring step 1420. Step 1420 performs iterative turbulence removal in the same manner as step 220. Step 1420 can be implemented as described with reference to the method 900 of FIG. 9.

The method 1400 continues from step 1420 to a check step 1460. Step 1460 checks if the total iteration number n has been reached. If so ("Yes" at step 1460), the method 1400 continues to a check step 1470. The check step 1470 checks if another frame is available. If another frame is available ("Yes" at step 1470) the method 1400 operates to load the next frame and return to step 1420 to perform deblurring for the newly loaded frame for n iterations.

If at step 1460 the iterations have not finished for the current frame ("No" at step 1460), the method 1400 returns to step 1420 to continue iterative deblurring for the current frame.

Returning to step 1470, if no further frames are available ("No"), the method 1400 ends.

Because the total iteration number does not change once the iterations start, the method 1400 requires less core memory capacity than the method 200. As shown in FIG. 4, for the case of 4 iterations, only 10 frames will need to be kept in core memory for fast access.

Figure 15:
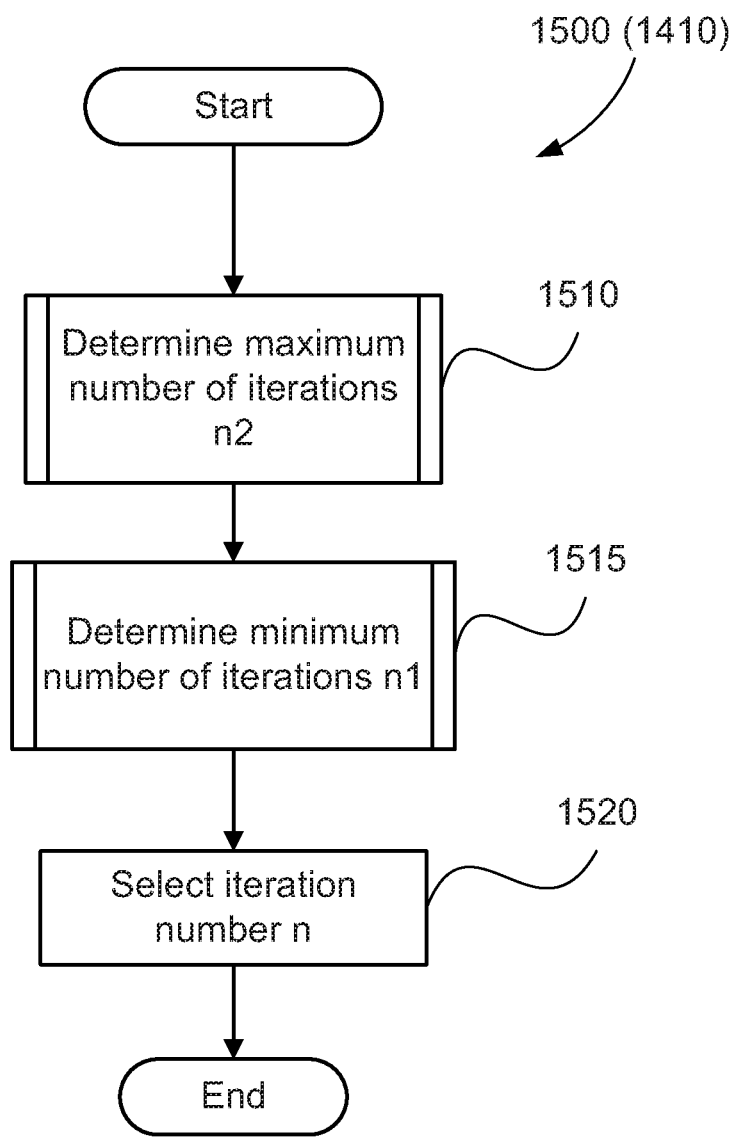
FIG. 15 shows a method of determining an iteration number as used in the method in FIG. 14.

A method 1500 of determining the iteration number n, as implemented at step 1410 is now described with reference to FIG. 15. The method 1500 is typically implemented as one of more modules of the application 1733, stored in the memory 1709 and controlled under execution of the processor 1705.

The method 1500 starts at a determining step 1510. Step 1510 determines a maximum number of iterations that is allowed by the hardware and latency requirements. Step 1510 can be implemented using the method 800 as described with reference to FIG. 8.

The method 1500 continues from step 1510 to a determining step 1515. Step 1515 proceeds to determine the minimum number of iterations to provide effective turbulence correction of captured videos. Step 1515 can be implemented according to the method 700 as described with reference to FIG. 7.

The method 1500 continues from step 1515 to a selection step 1520. Step 1520 selects a total iteration number n based on the minimum value $n_1$ and the maximum value $n_2$. For example, the total iteration number n can be the average of $n_1$ and $n_2$. Alternatively, extra information such as the type of application can be considered. For example, if the turbulence imaging system is used for security monitoring, fast response is important, then a weighted average of $n_1$ and $n_2$ can be used where $n_1$ is given more weight, as shown in Equation (2).

$$n=(2n_1+n_2)/3 \qquad (2)$$

On the other hand, if low latency is not critical to the system, for example for applications such as weather data collection, more weight can be given to $n_2$.

In another alternative embodiment, the total iteration number for all frames is not updated during the iterations. Instead, a fixed total iteration number is estimated before the iterations start and used throughout the iterations for each frame. In the embodiment, the total iteration number is updated and determined individually for each frame. Therefore, each frame can have a different total iteration number n.

Figure 16:
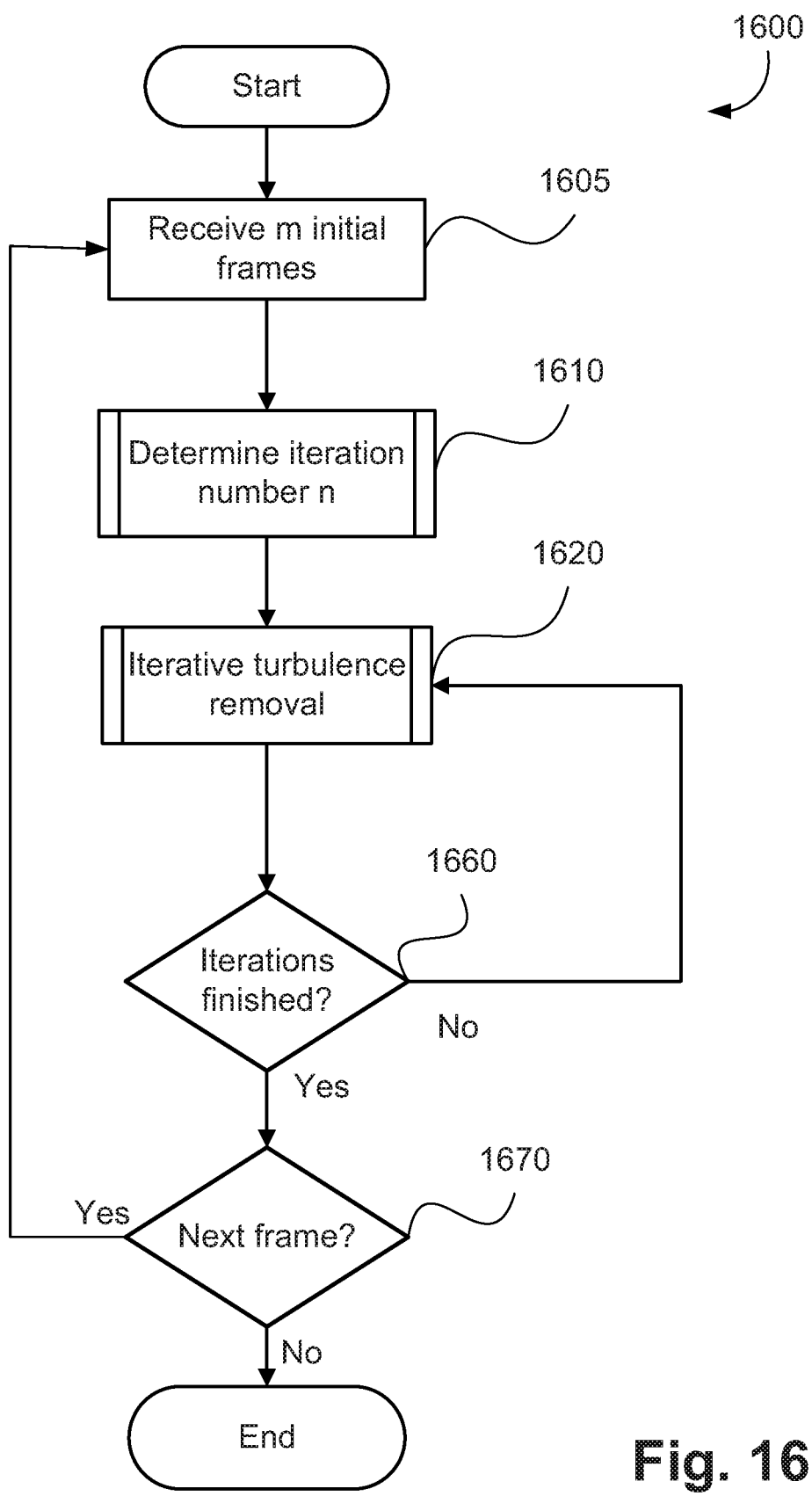
FIG. 16 shows a method of adaptive image quality improvement for turbulence image capture devices where the total iteration number varies from frame to frame but does not change during iterations for a single frame.

FIG. 16 shows a method 1600 of performing iterative video quality improvement using a total different iteration number for each frame. The method 1600 is typically implemented as one of more modules of the application 1733, stored in the memory 1709 and controlled under execution of the processor 1705.

The method 1600 begins at a receiving step 1605. Step 1605 receives first m initial frames, similarly to step 205. The number of frames m loaded in step 1605 is an initial estimate. For example, a typical value for m could be 5 to 8, depending on the application and system hardware.

The method 1600 continues from step 1605 to a determining step 1610. Step 1610 determines the iteration number n. The step 1610 can be implemented in the same manner as the steps 210 and 215 of the method 200. Alternatively, the method 1500 can be implemented at step 1610. Once the total iteration number n is determined, the method 1600 continues to a deblurring step 1620. Step 1620 performs the same iterative deblurring technique as step 220. Step 1620 can be implemented using the method 900 as described with reference to FIG. 9.

The method 1600 continues from step 1620 to a check step 1660. Step 1660 checks if the total iteration number n for the current frame has been reached. If the total iteration number has been reached ("Yes" at step 1660), the method 1600 continues to a check step 1670. Step 1670 checks if there is another frame to load. If there is another frame ("Yes" at step 1670), the step 1670 loads the next frame and the method 1600 returns to step 1605 to receive m frames relating to the newly loaded frame. If iterations have not finished for the current frame ("No" at step 1660), the method 1600 continues implement another iteration of deblurring at step 1620 for the current frame. If step 1670 determines that no further frames are available ("No" at step 1670) the method 1600 terminates.

In the method 1600, because the total iteration numbers may change from frame to frame, the memory requirement is in general larger than 2 (n+1) where n is the iteration number. Depending on the actual iteration numbers of neighbouring frames, as described above, the number of frames that need to be kept in memory can vary between 2(n+1) and $$2(n+1) + \frac{(n_s - n)(n_s + n + 3)}{2}$$

where n is the iteration number for current frame and $n_s$ is the iteration number for the previous frame.

The details of the iteration number estimation step (1610) have been discussed with reference to FIG. 15. The details of the iterative deblurring step (1620) have been discussed with reference to FIG. 9.

The arrangements described are applicable to the computer and data processing industries and particularly for the image processing. The arrangements described are particularly suitable for long range turbulence removal in real-time. In determining the number of iterations and the corresponding minimum frame set in the manner described, the number of frames required for storage to generate a corrected frame can be reduced and the method can be implemented in real-time.

In an example practical implementation, the arrangements described are used to improve or deblur an image of a car captured by the device 1701 from a long range distance. The method 200 is implemented using a number of iterations determined according to memory requirements of the device 1701 to remove effects of turbulence from the captured images of the car.

The foregoing describes only some embodiments of the present invention, and modifications and/or changes can be made thereto without departing from the scope and spirit of the invention, the embodiments being illustrative and not restrictive.

The invention claimed is:

1. A method of removing turbulence from an image of a time ordered sequence of image frames, the method comprising:
    removing effects of turbulence from a first image of the time ordered sequence of frames to create an initial corrected image frame;
    determining a number of iterations required to achieve a desired amount of turbulence removal for a subsequent image in the sequence and satisfy a latency constraint and an available memory capacity, the latency and the available memory capacity relating to a computing system implementing the turbulence removal;
    determining, based on the number of required iterations, a minimum set of image frames required to remove turbulence from the subsequent image, wherein said minimum set of image frames is stored in the available memory and comprises: a number of image frames of time ordered sequence of image frames, a number of image frames generated in an intermediate iteration of turbulence removal and the initial corrected image frame; and
    using said minimum set of image frames to remove turbulence from the subsequent image of time ordered sequence of image frames of a video to output a subsequent corrected image.

2. The method according to claim 1, further comprising determining, using the subsequent corrected image, that an additional iteration of turbulence removal is required.

3. The method according to claim 1, further comprising determining, using the subsequent corrected image, that an additional iteration of turbulence removal is required and that the additional iteration of turbulence removal satisfies the latency constraint and the available memory capacity.

4. The method according to claim 1, further comprising determining, using the subsequent corrected image, that an additional iteration of turbulence removal is required, wherein the minimum number of frames is updated to add a corrected version of a previous frame from a previous iteration.

5. The method according to claim 1, wherein determining the number of iterations comprises determining a maximum number of iterations to satisfy the latency constraint and the available memory capacity.

6. The method according to claim 1, wherein determining the number of iterations comprises determining a minimum number of iterations to provide the desired amount of turbulence removal.

7. The method according to claim 1, wherein determining the number of iterations comprises determining a minimum number of iterations to provide the desired amount of turbulence removal, and the minimum number of iterations is determined based on a geometric similarity of a number of the frames of the time ordered sequence.

8. The method according to claim 1, further comprising determining, using the subsequent corrected image, that additional turbulence removal is required, wherein the number of iterations is increased by a maximum of one iteration.

9. The method according to claim 1, wherein determining the number of iterations comprises: determining a maximum number of iterations to satisfy the latency constraint and the available memory capacity; determining a minimum number of iterations to provide the desired amount of turbulence removal; and determining an average of the maximum and minimum number of iterations.

10. The method according to claim 1, wherein determining the number of iterations comprises: determining a maximum number of iterations to satisfy the latency constraint and the available memory capacity; determining a minimum number of iterations to provide the desired amount of turbulence removal; and determining an average of the maximum and minimum number of iterations; and the determined average number of iterations is used for every image frame of the time ordered sequence.

11. The method according to claim 1, wherein the number of iterations required is determined separately for each image frame of the time ordered sequence.

12. The method according to claim 1, wherein the turbulence removal comprises removing spatial blur followed by geometric distortion removal using the minimum set of frames stored in the memory.

13. The method according to claim 1, wherein the method is implemented in real-time as the time ordered sequence of image frames is captured.

14. The method according to claim 1, wherein determining the number of iterations comprises determining a minimum number of iterations to provide the desired amount of turbulence removal, and a desired level of turbulence removal is determined using a gradient-based structural similarity index (G-SSIM) method and a number of the image frames of the time ordered sequence.

15. The method according to claim 1, wherein removing turbulence from the subsequent image comprises combining (i) the initial corrected image, (ii) a corrected image of the subsequent frame from an intermediate iteration immediately preceding a current iteration and (ii) and an image frame for a next subsequent image in the sequence as corrected in a previous iteration.

16. A non-transitory computer readable medium having a computer program stored thereon to implement a method of removing turbulence from an image of a time ordered sequence of image frames, the program comprising:
code for removing effects of turbulence from a first image of the time ordered sequence of frames to create an initial corrected image frame;
code for determining a number of iterations required to achieve a desired amount of turbulence removal for a subsequent image in the sequence and satisfy a latency constraint and an available memory capacity, the latency and the available memory capacity relating to a computing system implementing the turbulence removal;
code for determining, based on the number of required iterations, a minimum set of image frames required to remove turbulence from the subsequent image, wherein said minimum set of image frames is stored in the available memory and comprises: a number of image frames of time ordered sequence of image frames, a number of image frames generated in an intermediate iteration of turbulence removal and the initial corrected image frame; and
code for using said minimum set of image frames to remove turbulence from the subsequent image of time ordered sequence of image frames of a video to output a subsequent corrected image.

17. An image capture device, comprising:
a memory; and
a processor configured to execute code stored on the memory implement a method of removing turbulence from an image of a time ordered sequence of image frames captured by the image capture device, the method comprising:
removing effects of turbulence from a first image of the time ordered sequence of frames to create an initial corrected image frame;
determining a number of iterations required to achieve a desired amount of turbulence removal for a subsequent image in the sequence and satisfy a latency constraint and an available capacity of the memory, the latency constraint relating to the image capture device and;
determining, based on the number of required iterations, a minimum set of image frames required to remove turbulence from the subsequent image, wherein said minimum set of image frames is stored in the available memory and comprises: a number of image frames of time ordered sequence of image frames, a number of image frames generated in an intermediate iteration of turbulence removal and the initial corrected image frame; and
using said minimum set of image frames to remove turbulence from the subsequent image of time ordered sequence of image frames of a video to output a subsequent corrected image.

18. A system, comprising:
a memory; and
a processor, wherein the processor is configured to execute code stored on the memory for implementing a method of removing turbulence from an image of a time ordered sequence of image frames, the method comprising:
removing effects of turbulence from a first image of the time ordered sequence of frames to create an initial corrected image frame;
determining a number of iterations required to achieve a desired amount of turbulence removal for a subsequent image in the sequence and satisfy a latency constraint and an available memory capacity of the memory, the latency relating to a computing system implementing the turbulence removal;

determining, based on the number of required iterations, a minimum set of image frames required to remove turbulence from the subsequent image, wherein said minimum set of image frames is stored in the available memory and comprises: a number of image frames of time ordered sequence of image frames, a number of image frames generated in an intermediate iteration of turbulence removal and the initial corrected image frame; and using said minimum set of image frames to remove turbulence from the subsequent image of time ordered sequence of image frames of a video to output a subsequent corrected image.

* * * * *